(12) United States Patent
Ryu et al.

(10) Patent No.: US 11,614,055 B2
(45) Date of Patent: Mar. 28, 2023

(54) ISOLATION VALVE

(71) Applicants: HYUNDAI MOTOR COMPANY, Seoul (KR); KIA CORPORATION, Seoul (KR)

(72) Inventors: Bu Yeol Ryu, Hwaseong-si (KR); Hyun Do Jeon, Seoul (KR); Tac Koon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/554,943

(22) Filed: Dec. 17, 2021

(65) Prior Publication Data
US 2022/0403802 A1    Dec. 22, 2022

(30) Foreign Application Priority Data

Jun. 16, 2021 (KR) ........................ 10-2021-0078028

(51) Int. Cl.
*F02M 25/08* (2006.01)
*F16K 31/06* (2006.01)
*F16K 31/10* (2006.01)

(52) U.S. Cl.
CPC ..... *F02M 25/0836* (2013.01); *F16K 31/0655* (2013.01); *F16K 31/10* (2013.01); *F02M 2025/0845* (2013.01)

(58) Field of Classification Search
CPC .... F02M 25/00; F02M 25/08; F02M 25/0836; F02M 25/0845; F02M 25/0854; F02M 25/0855; F02M 2025/0845; F16K 11/161; F16K 15/03; F16K 31/06; F16K 31/0655;
(Continued)

(56) References Cited

U.S. PATENT DOCUMENTS 7,107,971 B2 * 9/2006 Spink ................. G05D 16/0663
                                                        123/518
8,573,255 B2   11/2013 Pifer et al.
(Continued)

FOREIGN PATENT DOCUMENTS

JP     2017057724 A    3/2017
KR     101076231 B1    10/2011
(Continued)

*Primary Examiner* — John Kwon
*Assistant Examiner* — Johnny H Hoang
(74) *Attorney, Agent, or Firm* — Lempia Summerfield Katz LLC

(57) ABSTRACT

An isolation valve includes: a housing including a first passage and a second passage; a main valve assembly including a valve disposed in the housing such that a fluid flow between the first passage and the second passage is blocked; a locking assembly disposed in the housing, and including a release element configured to open the valve and a locking element configured to close the valve; and a bobbin assembly configured to be disposed in the housing and to operate the locking assembly, and including a coil; a core disposed inside the coil and including a space therein, the space including a closed end and an opened end; and a plunger configured to move in the space by an electromagnetic force generated by the coil and to contact the locking assembly on the opened end side.

20 Claims, 34 Drawing Sheets

[ Section A-A' ]

(58) Field of Classification Search
CPC ... F16K 31/10; F16K 31/52408; B60K 15/03; B60K 2015/03256
See application file for complete search history.

(56) References Cited

U.S. PATENT DOCUMENTS

| | | | |
|---|---|---|---|
| 8,925,522 B2* | 1/2015 | Landenberger | F02M 59/445 |
| | | | 123/458 |
| 9,200,719 B2* | 12/2015 | Kishi | F16K 31/02 |
| 9,500,291 B2 | 11/2016 | Pifer et al. | |
| 9,631,583 B2 | 4/2017 | Balsdon et al. | |
| 9,890,747 B2 | 2/2018 | Williams et al. | |
| 10,202,035 B2 | 2/2019 | Ogiwara et al. | |
| 10,717,353 B2 | 7/2020 | Vulkan et al. | |
| 11,280,425 B2* | 3/2022 | Kim | F16K 31/0655 |
| 2014/0042347 A1* | 2/2014 | Williams | F16K 31/0655 |
| | | | 251/129.02 |
| 2015/0144819 A1* | 5/2015 | Piter | F16K 24/04 |
| | | | 251/129.15 |
| 2016/0369714 A1* | 12/2016 | Burleigh | F02M 25/0836 |
| 2017/0036531 A1 | 2/2017 | Mclauchlan et al. | |
| 2017/0107953 A1* | 4/2017 | Weldon | F02M 26/53 |
| 2018/0045373 A1* | 2/2018 | Frenal | F17C 7/00 |
| 2018/0135579 A1* | 5/2018 | Kusakabe | F02M 59/466 |
| 2019/0084410 A1* | 3/2019 | Bhandari | B60K 15/03519 |

FOREIGN PATENT DOCUMENTS

| | | |
|---|---|---|
| KR | 10-2012-0032741 A | 4/2012 |
| KR | 10-2012-0060510 A | 6/2012 |

\* cited by examiner

FIG. 1 "PRIOR ART"
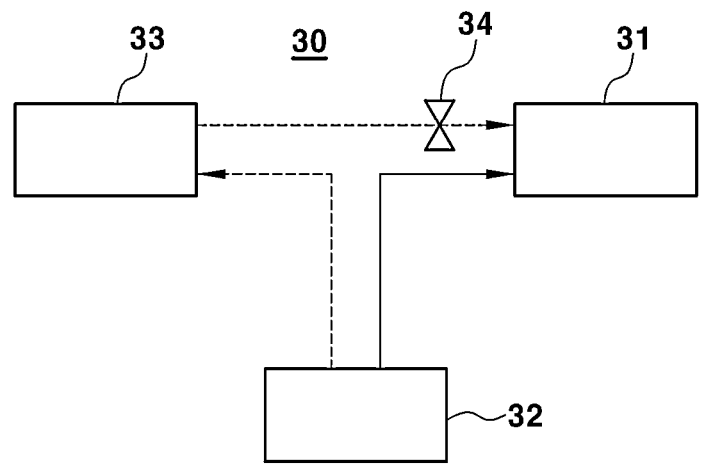
FIG. 2
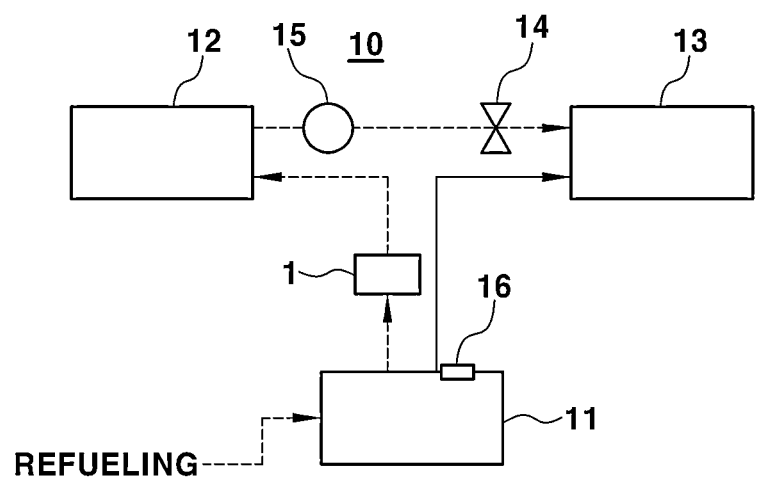

[ Section A-A' ]

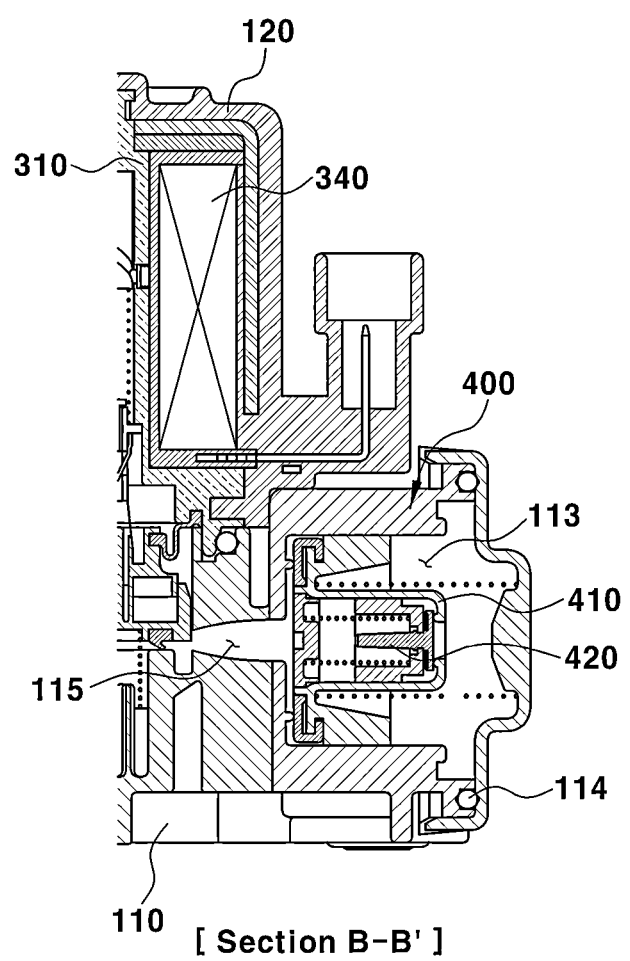

[ Section C-C' ]

[ Section D-D' ]

ISOLATION VALVE

CROSS-REFERENCE TO RELATED APPLICATION

This application claims the benefit of and priority to Korean Patent Application No. 10-2021-0078028, filed on Jun. 16, 2021, the entire contents of which are incorporated herein by reference.

BACKGROUND

Field

The present disclosure relates to an isolation valve and, particularly, to an isolation valve for an isolation type fuel system for a plug-in hybrid electric vehicle.

Related Art

A hybrid electric vehicle includes a general hybrid electric vehicle (HEV) and a plug-in hybrid electric vehicle (PHEV). The plug-in hybrid electric vehicle (PHEV) may be clearly distinguished from the general hybrid electric vehicle (HEV) in that it receives electricity from the outside to charge a battery and uses the electric energy from the battery to drive a vehicle. Further, the plug-in hybrid electric vehicle (PHEV) has a system charging the battery using an engine inside the vehicle and, therefore, is clearly distinguished from a battery electric vehicle (BEV).

The plug-in hybrid electric vehicle (PHEV) has both the feature of the electric vehicle and the engine, so it is required to be able to suppress an evaporation gas generated in a fuel tank from being discharged.

FIG. 1 schematically illustrates a fuel system 30 for a vehicle. Referring to FIG. 1, since a gasoline used in an engine 31 has volatility, the gasoline vaporizes in a state of being stored in a fuel tank 32 and becomes an evaporation gas. The generated evaporation gas flows into a canister 33 when the engine is stopped, and the evaporation gas flowing into the canister 33 is adsorbed by an activated carbon or the like and collected in the canister 33. When a purge valve 34 is opened at an appropriate time when the engine 31 is operated, the collected evaporation gas flows into the engine 31 via an intake air negative pressure of the engine 3 1and then is combusted again in the engine. As described above, an operation of supplying the evaporation gas to the engine 31 is referred to as a purge.

In particular, the plug-in hybrid electric vehicle (PHEV) has a driving rate of an electric motor higher than that of the engine, so the number of times of the engine purge is decreased. In other words, in an electric vehicle (EV) mode in which the engine does not operate for driving and only the motor operates for driving the vehicle, the purge is impossible. Therefore, the canister exceeds the collection limit especially during parking, which causes the evaporation gas to be discharged to the atmospheric air.

The above information disclosed in this Background section is only for enhancement of understanding of the background of the disclosure and accordingly it may include information that does not form the prior art that is already known to a person having ordinary skill in the art.

SUMMARY OF THE DISCLOSURE

The present disclosure has been made in an effort to solve the above problem associated with the related art, and an object of the present disclosure is to provide an isolation valve providing good isolation performance.

Another object of the present disclosure is to provide an isolation valve capable of decreasing power consumption.

Still another object of the present disclosure is to provide an isolation valve including a structure capable of maintaining a closed or opened state without power consumption.

Yet another object of the present disclosure is to provide an isolation valve capable of solving a problem caused by a rapid change in pressure when the isolation valve is opened.

The objects of the present disclosure are not limited to the aforementioned objects, and other objects not mentioned may be clearly understood by those skilled in the art to which the present disclosure pertain (hereinafter referred to as 'those skilled in the art') from the following description.

The features of the present disclosure for achieving the objects of the present disclosure and the characteristic functions of the present disclosure to be described later are as follows.

An isolation valve according to an exemplary embodiment of the present disclosure includes a housing including a first passage and a second passage different from the first passage; a main valve assembly including a valve disposed in the housing to block a fluid flow between the first passage and the second passage; a locking assembly disposed in the housing and including a release element configured to open the valve and a locking element configured to close the valve; and a bobbin assembly configured to be disposed in the housing and to operate the locking assembly, and including a coil; a core disposed inside the coil and including a space therein, the space including a closed end and an opened end; and a plunger configured to move in the space by an electromagnetic force generated by the coil and to contact the locking assembly on the opened end side, in which the plunger is configured to linearly move upon movement from the closed end toward the opened end in the space and to rotate by a preset angle upon movement from the opened end toward the closed end to selectively pressurize any one of the locking element and the release element of the locking assembly.

The present disclosure provides the isolation valve having the good isolation performance.

The present disclosure provides the isolation valve capable of significantly decreasing the power consumption.

The isolation valve according to the present disclosure may continuously maintain the closed or opened state of the isolation valve without the power consumption.

The present disclosure provides the isolation valve capable of solving the problem caused by the sudden pressure change when the isolation valve is opened.

The effects of the present disclosure are not limited to the aforementioned effects, and other effects not mentioned may be clearly recognized by those skilled in the art from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure are described below in detail with reference to certain exemplary examples thereof illustrated in the accompanying drawings which are given herein below by way of illustration only, and thus are not limitative of the present disclosure, and wherein:

FIG. 1 illustrates an exemplary fuel system for a vehicle;

FIG. 2 illustrates a fuel system for a plug-in hybrid electric vehicle;

FIG. 7 illustrates a cross-sectional diagram taken along line B-B' in FIG. 6;

FIGS. 8A to 8C are partial enlarged diagrams of FIG. 7, in which FIG. 8A illustrates a state of a relief valve when a pressure inside a fuel tank is normal, FIG. 8B illustrates an opening of a positive pressure valve of the relief valve when the pressure inside the fuel tank is in an overpressure state, and FIG. 8C illustrates an opening of a negative pressure valve of the relief valve when the pressure inside the fuel tank is in an underpressure state;

Figure 3:
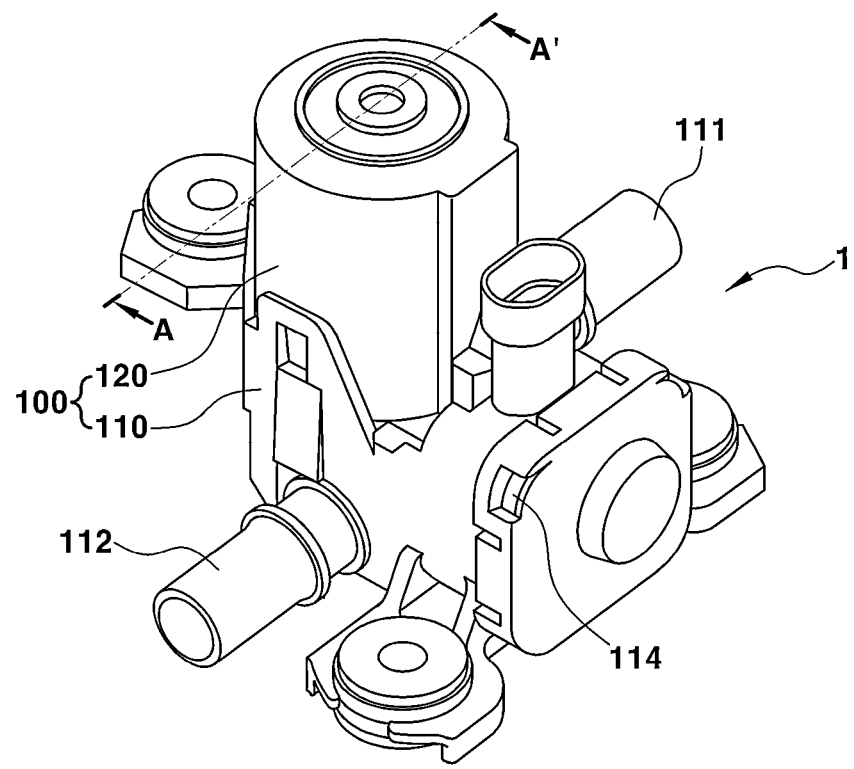
FIG. 3 illustrates a perspective diagram of an isolation valve according to an embodiment of the present disclosure.
Figure 4:
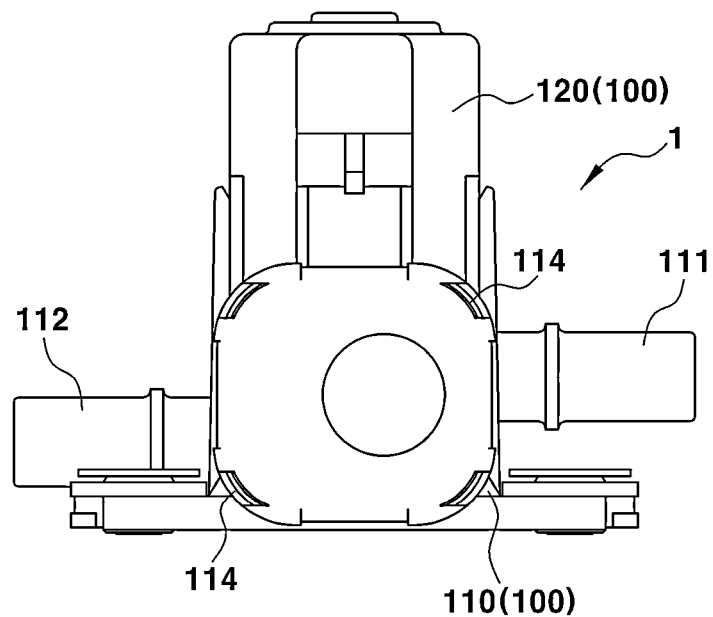
FIG. 4 is a front diagram of FIG. 3.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, exemplary embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

As described above, as a plug-in hybrid electric vehicle (PHEV) does not have a high driving rate of an engine, it is difficult to remove an evaporation gas collected in a canister by driving the engine. Therefore, to prevent the evaporation gas from being discharged to the atmospheric air, an isolation type fuel system isolating the evaporation gas in a fuel tank by reinforcing the rigidity of the fuel tank is applied to the plug-in hybrid electric vehicle (PHEV).

FIG. 2 illustrates an isolation type fuel system 10 to which an exemplary isolation valve 1 or the isolation valve 1 according to the present disclosure of the plug-in hybrid electric vehicle (PHEV) may be applied. Referring to FIG. 2, the isolation valve 1 is installed between a fuel tank 11 and a canister 12 and is always maintained in a closed state. In the plug-in hybrid electric vehicle (PHEV), the number of times of the purge of an engine 13 is extremely small, so an evaporation gas generated during traveling and parking of the EV is isolated and stored in the fuel tank 11. Further, an operation of the isolation valve 1 is controlled by an engine control unit. Also, a leak diagnosis device 15 configured to diagnose leak is provided between the canister 12 and a purge valve 14.

The isolation type fuel system 10 is a pressurizing system by adding the isolation valve 1 to a rear end of the fuel tank 11 to inhibit or prevent the evaporation gas in the fuel tank 11 from flowing into the canister 12. Therefore, since there is a risk of fuel scattering during refueling due to an increase in pressure in the fuel tank 11, special control is desired during refueling.

When there is a request for refueling, the engine control unit opens the isolation valve 1 to remove the pressure of the fuel tank 11. The engine control unit determines whether the pressure of the fuel tank 11 is removed based on a measured value from a pressure sensor 16 provided in the fuel tank 11 and enables refueling only after the pressure is removed. Several features desired for the isolation valve 1 are as follows.

First, the isolation valve should form an isolation system in the fuel tank and smoothly remove the pressure therein.

When the isolation valve is opened during refueling, a current of about 0.7 to 1 ampere (A) is consumed and may be supplied only for up to about 20 minutes. The power applied to the isolation valve is supplied from an auxiliary battery (12 V battery) for a vehicle, which may cause a discharge problem of the auxiliary battery.

Further, when the power is applied, severe heat is generated in the isolation valve. Since an operation of an amateur is instantaneous due to the characteristics of the isolation valve, which is a solenoid, an amount of heat generated by a coil is large when the state is maintained. Therefore, if the power is applied to the isolation valve for a long time, a casing of the isolation valve may be melted, or fire may occur due to the generated heat.

To solve the above problems, the present disclosure provides an isolation valve including a structure in which power is not required to be continuously applied for maintaining an opened position of the isolation valve. In particular, with an application of power for a short period of time, the present disclosure may allow the opened state of the isolation valve to be maintained after power supply is ceased. According to the present disclosure, when the state of the isolation valve is switched from the opened state to a closed state or from the closed state to the opened state, a plunger of the isolation valve may be configured to rotate at a certain angle to selectively switch the isolation valve between the opened and closed positions. Hereinafter, an isolation valve according to an embodiment of the present disclosure in which the power is not required to be continuously supplied is described in detail.

As illustrated in FIGS. 3 to 7, the isolation valve 1 according to an embodiment of the present disclosure includes a solenoid valve and a relief valve. The solenoid valve includes a main valve assembly 200 and a bobbin assembly 300, and the relief valve includes a relief valve assembly 400. In another form, the isolation valve 1 further includes a locking assembly 500.

The main valve assembly 200, the bobbin assembly 300, the relief valve assembly 400, and the locking assembly 500 are accommodated in a housing 100. In one form of the present disclosure, the housing 100 may include a lower housing 110 and an upper housing 120. In the present specification, the housing 100 will be described by being divided into the upper housing 120 and the lower housing 110, but they may also be composed of one housing or two or more housings.

The main valve assembly 200 is installed in the lower housing 110, and the lower housing 110 includes a fuel tank side passage 111 and a canister side passage 112. The fuel tank side passage 111 is connected to the fuel tank 11, and the canister side passage 112 is connected to the canister 12. The fuel tank side passage 111 and the canister side passage 112 are configured to fluid-communicate with each other or to block the fluid flow by a position of the main valve assembly 200.

Further, the relief valve assembly 400 is mounted in the lower housing 110. The relief valve assembly 400 serves to remove overpressure or underpressure in the fuel tank 11 when the main valve assembly 200 is at a closed position. To this end, according to an implementation example of the present disclosure, one side of the lower housing 110 is provided with a chamber 113, and the relief valve assembly 400 is accommodated in the chamber 113. In another form, the chamber 113 is configured to fluidly communicate with the lower housing 110 or an outside of the chamber 113. As a non-limiting example, the chamber 113 may include one or more exhaust holes 114. The exhaust hole 114 is provided in the lower housing 110 to communicate the inside and outside of the chamber 113.

Further, the chamber 113 is configured to be selectively fluid-communicable with the fuel tank side passage 111. According to an implementation example of the present disclosure, the lower housing 110 includes a flow path 115 communicating the chamber 113 with the fuel tank side passage 111. The flow path 115 is configured to be selectively opened or closed by the operation of the relief valve assembly 400. According to an implementation example of the present disclosure, the relief valve assembly 400 includes a positive pressure valve 410 and a negative pressure valve 420.

Figure 8A:
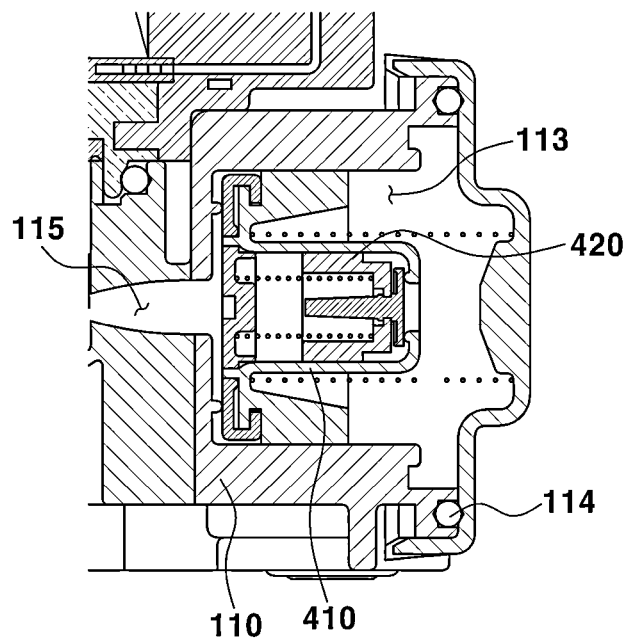
Figure 8B:
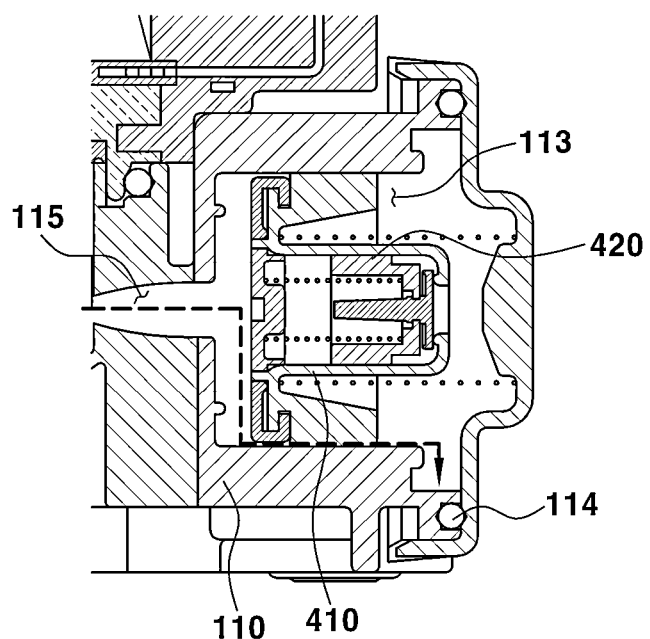
Figure 8C:
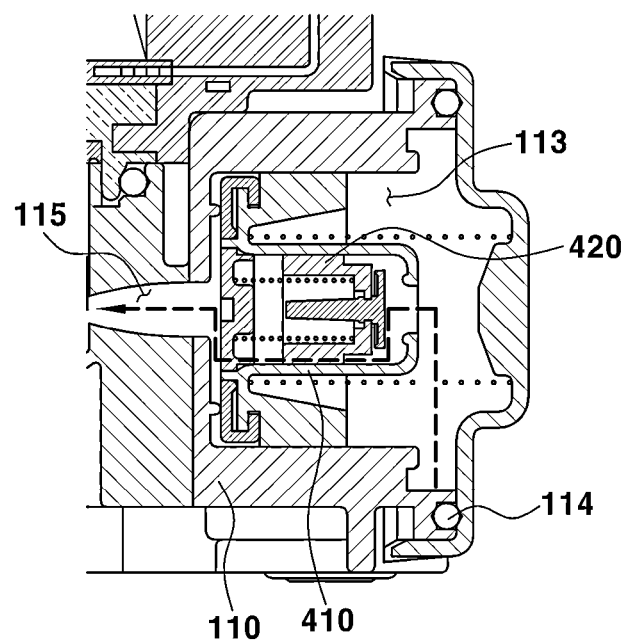

Referring to FIGS. 8A to 8C, the positive pressure valve 410 is accommodated in the chamber 113. When the pressure of the fuel tank 11 is in a normal range, the positive pressure valve 410 is in a closed position to block the flow between the inside of the chamber 113 and the flow path 115. In the closed position of the positive pressure valve 410, the positive pressure valve 410 blocks the flow path 115 (a state in FIG. 8A). For example, the normal range may be −10 kPa (kilopascal) to 28 kPa. In other words, when the pressure of the fuel tank 11 is in the normal range, the positive pressure valve 410 is in the closed position.

When overpressure is formed in the fuel tank 11, the positive pressure valve 410 moves to an opened position. In the aforementioned example, the overpressure may be a pressure exceeding 28 kPa. At the overpressure, a pressure of the fluid at the flow path 115 side surpasses a restoring force of a spring of the positive pressure valve, which maintains the positive pressure valve 410 closed, such that the positive pressure valve 410 is opened. In the opened position of the positive pressure valve 410, the positive pressure valve 410 is spaced apart from an inlet of the flow path 115 to form the passage of the fluid flow. In other words, the gas from the fuel tank 11 is discharged through the exhaust hole 114 while flowing into the chamber 113 through the flow path 115 (a state in FIG. 8B). As a result, the overpressure of the fuel tank 11 may be removed.

When the underpressure is formed in the fuel tank 11, the underpressure may be removed by flowing the air into the housing 100 through the exhaust hole 114. The negative pressure valve 420 is mounted inside the positive pressure valve 410. The negative pressure valve 420 is mounted to communicate the outside of the lower housing 110 through the chamber 113 or the exhaust hole 114, the inside of the positive pressure valve 410, and the flow path 115 while moving in the positive pressure valve 410. In the closed position of the negative pressure valve 420, the flow between the exhaust hole 114, the inside of the positive pressure valve 410, and the flow path 115 is blocked. In particular, the negative pressure valve 420 is disposed to block the flow between the inside of the positive pressure valve 410 and the exhaust hole 114. In the open position of the negative pressure valve 420, the underpressure in the fuel tank 11 may be removed while the exhaust hole 114, the inside of the positive pressure valve 410, and the flow path 115 communicate with each other. Specifically, when the underpressure in the fuel tank 11, e.g., less than −10 kPa, is formed, the air flows into the positive pressure valve 420 while a spring of the negative pressure valve closely contacting the negative pressure valve 420 with the positive pressure valve 410 is compressed. The negative pressure valve 420 is configured such that the air ultimately flows therein through the flow path 115 while communicating the exhaust hole 114 with the inside of the positive pressure valve 410 (a state in FIG. 8C).

Referring back to FIG. 5, the bobbin assembly 300 is disposed above the main valve assembly 200. The upper housing 120 is coupled to the lower housing 110 while covering the bobbin assembly 300.

The bobbin assembly 300 includes a core 310, a yoke 320, a bobbin 330, and a coil 340. The core 310 is fixed in the upper housing 120 by the yoke 320. The core 310 is inserted into the bobbin 330, and the coil 340 is wound around the bobbin 330.

Figure 9A:
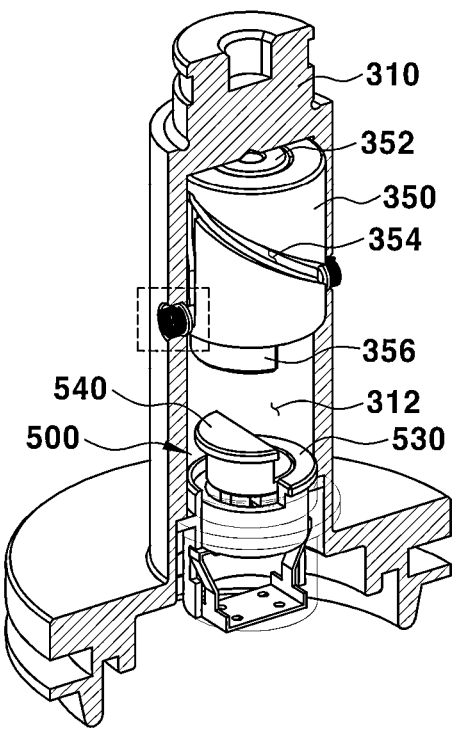
FIG. 9A illustrates a longitudinal cross-sectional diagram of a bobbin assembly according to an embodiment of the present disclosure.

Referring to FIG. 9A, a space 312 is provided inside the core 310. A plunger 350 and a return spring 360 are disposed in the space 312. The return spring 360 in the space 312 is disposed to support the plunger 350, and the plunger 350 is configured to be movable in the space 312. The plunger 350 is made of a magnetic material. Therefore, when current is supplied to the coil 340, the plunger 350 may be configured to be movable in the space 312. A damping element 352 made of rubber is mounted above the plunger 350. The damping element 352 absorbs an impact force when the plunger 350 collides with the core 310 upon movement and protects the plunger 350.

Figure 9B:
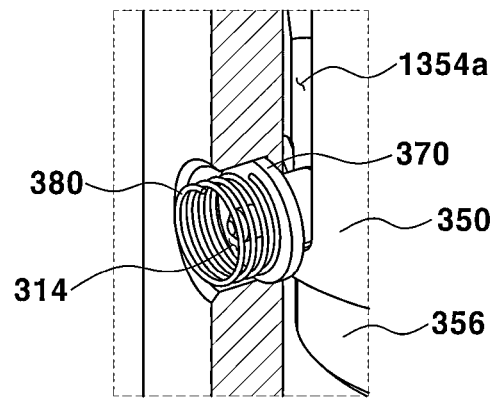
FIG. 9B is an enlarged diagram of a dotted box of FIG. 9A.

Referring to FIG. 9B, the plunger 350 is configured to be rotatable while moving in the space 312. To this end, according to an implementation example of the present disclosure, the core 310 has a pair of sidewall holes 314. The sidewall holes 314 are configured to face each other in the core 310. A guide pin 370 and a guide pin spring 380 are disposed in the sidewall hole 314. The guide pin 370 is arranged to be movable in the sidewall hole 314 in a direction parallel to the sidewall hole 314, that is, in a horizontal direction. The guide pin spring 380 is compressed when the guide pin 370 moves to the outside of the sidewall hole 314, and restored when the guide pin 370 moves to the inside of the sidewall hole 314.

Figure 9C:
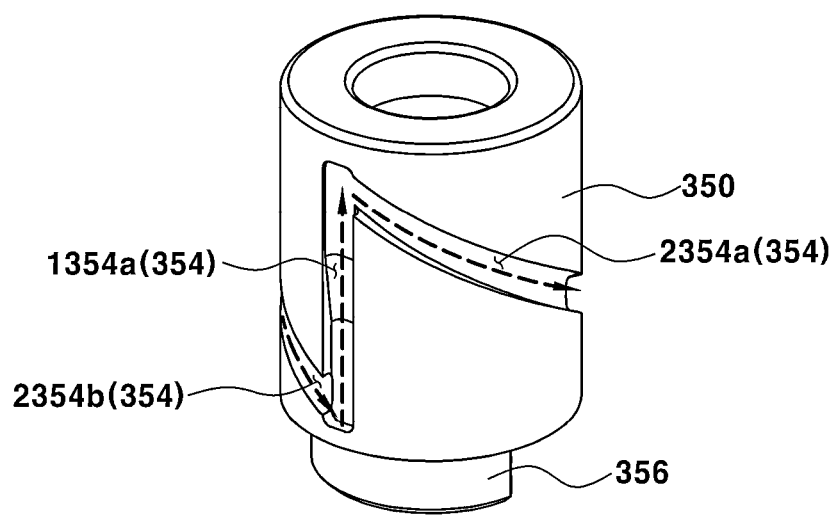
FIG. 9C is a perspective diagram of a plunger according to an exemplary embodiment of the present disclosure.

Meanwhile, as illustrated in FIG. 9C, the plunger 350 includes a guide groove 354 having a preset path in an outer circumference thereof. The guide pin 370 is configured to move along the path of the guide groove 354 on the guide groove 354. Therefore, the plunger 350 may linearly move and rotate as the guide pin 370 moves along the path of the guide groove 354. According to an implementation example of the present disclosure, the path includes a vertical path 1354 and an inclined path 2354.

The vertical path 1354 is formed in a direction substantially parallel to an axial direction of the plunger 350. Accordingly, when the guide pin 370 moves upward along the vertical path 1354, the plunger 350 moves downward in the space 312. A pair of vertical paths 1354 may be formed, and the pair of vertical paths 1354a, 1354b are provided at positions symmetric to an axial centerline of the plunger 350. In other words, the respective vertical paths 1354a, 1354b are provided at positions rotated with respect to each other by 180°.

The inclined path 2354 is formed to be oblique, inclined on the outer circumference of the plunger 350. The inclined path 2354 is configured to extend from the vertical path 1354 and to connect the pair of vertical paths 1354a, 1354b. For example, the inclined path 2354 may be obliquely formed by connecting the highest point of a first vertical path 1354a, which is one of the pair of vertical paths 1354a, 1354b, to the lowest point of a second vertical path 1354b, which is the other of the pair of vertical paths 1354a, 1354b. Like the vertical path 1354, a pair of inclined paths 2354a, 2354b may be provided. The pair of inclined paths 2354a, 2354b are formed to be rotationally symmetrical with respect to the axial center of the plunger 350.

Figure 10:
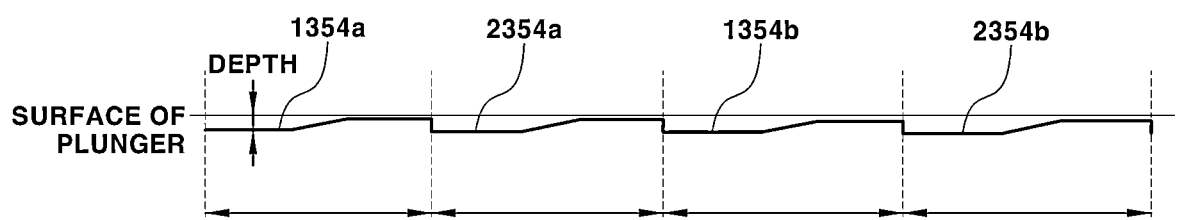
FIG. 10 schematically illustrates a depth of a guide groove of the plunger according to an exemplary embodiment of the present disclosure.

As illustrated in FIG. 10, the guide groove 354 may have different depths for each position on the path. A change in such a depth may allow the plunger 350 to only linearly move when the plunger 350 moves downward, while allowing the plunger 350 to linearly move and rotate together when the plunger 350 moves upward. The depth of the guide groove 354 generally decreases as the guide groove 354 moves up the plunger 350 on the vertical path 1354, and becomes larger on the highest point and lowest point of the vertical path 1354 than that of other areas.

The inclined path 2354 is also configured such that the depth of the guide groove 354 decreases from the highest point toward the lowest point and increases when reaching the lowest point. In other words, the depth of the guide groove 354 in an area where the vertical path 1354 and the inclined path 2354 meet may be formed to be larger than those of the other points, thereby preventing malfunction moving in a different direction, that is, returning to a previous path when the path of the guide pin 370 is turned. The guide pin spring 380 is compressed and stretched by a difference between the depths of the guide groove 354.

The plunger 350 includes a contact part 356. The contact part 356 protrudes downward from a lower portion of the plunger 350. The contact part 356 operates the locking assembly 500 directly operating the main valve assembly 200. According to an implementation example of the present disclosure, the contact part 356 protrudes by a preset circumference length of the circumference of the lower portion of the plunger 350. For example, the contact part 356 may be configured to have a length in a range of 180° in a circumferential direction of a lower surface of the plunger 350. The contact part 356 is formed on only one side of the lower surface of the plunger 350, so the plunger 350 may be configured to rotate by 180° to alternatively press one side and the other side of the locking assembly 500.

Figure 11:
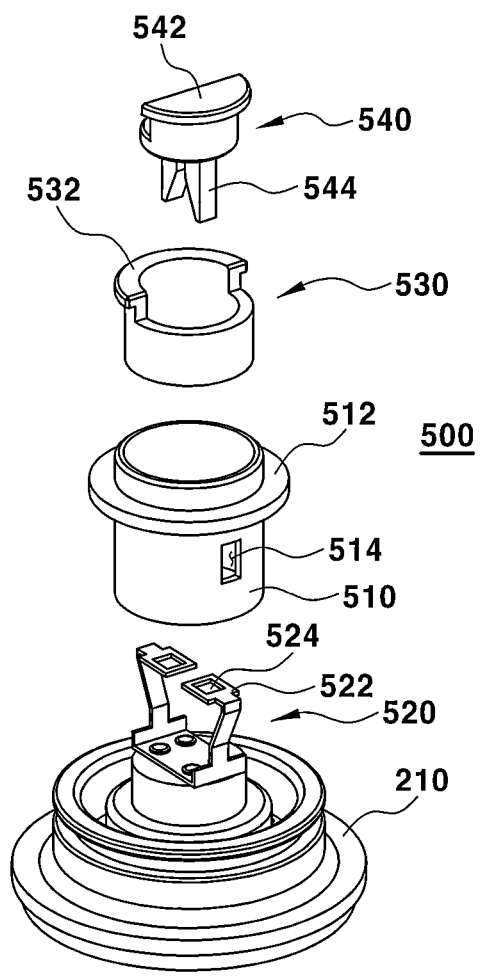
FIG. 11 is an exploded perspective diagram of a locking assembly according to an embodiment of the present disclosure.
Figure 12:
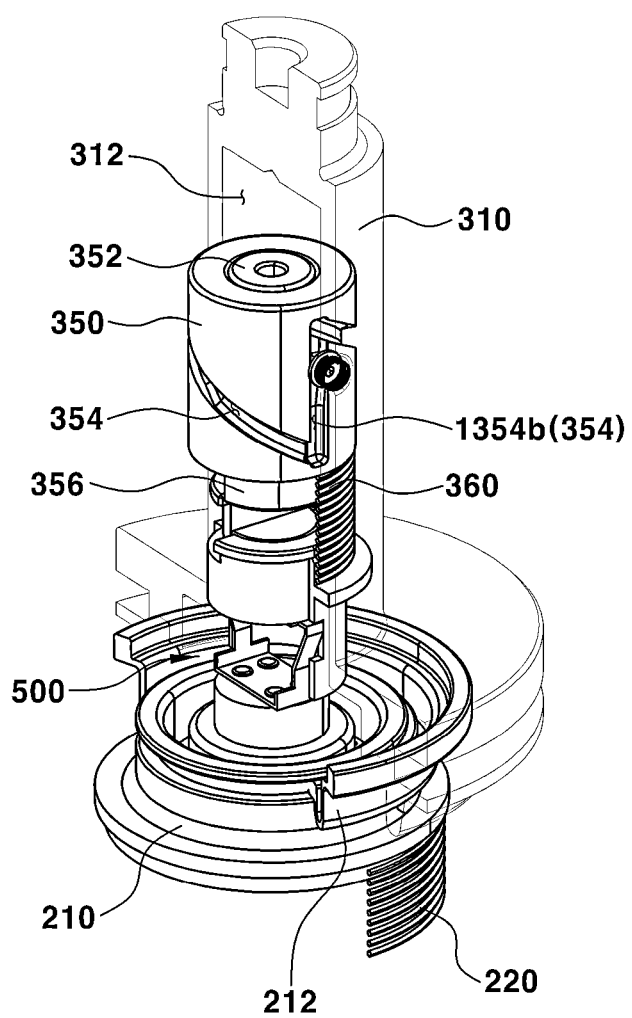
FIG. 12 illustrates a coupling relationship between the bobbin assembly, the locking assembly, and a main valve assembly according to an embodiment of the present disclosure.

As illustrated in FIGS. 11 and 12, the locking assembly 500 is disposed between the plunger 350 and the main valve assembly 200. According to an implementation example of the present disclosure, the locking assembly 500 includes a holder 510, a latch 520, a locking element 530, and a release element 540. The locking assembly 500 may be disposed to occupy a part of the space 312 of the core 310 while supporting the return spring 360.

In particular, the holder 510 may support the return spring 360. For example, a circumference of an upper side of the holder 510 may be configured to directly support the return spring 360. To this end, according to an implementation example of the present disclosure, the holder 510 includes a flange part 512 extending radially outward along the circumference from the outer circumferential surface thereof. The return spring 360 may be supported on the flange part 512. Further, the flange part 512 fixes the holder 510 to an inner wall of the core 310. Also, the holder 510 operably supports the release element 540, the locking element 530, and the latch 520.

The holder 510 is arranged to have a generally tubular shape, and the latch 520 is accommodated inside the holder 510. An upper end of the latch 520 includes a bent part 522 bent at a certain angle, for example, about a right angle. The bent part 522 may have a folding angle changeable by an external force. To this end, according to an implementation example of the present disclosure, the bent part 522 includes an insertion part 524 formed an end part of the bent part 522 and configured to receive a counter part (e.g., a fitting protrusion 544) in a substantially vertical direction, and the holder 510 includes a slot 514 communicating the inside and outside of the holder 510 with each other in the outer circumferential surface thereof. The latch 520 may be inserted into or detached from the slot 514 according to a change in the bending angle of the bent part 522. If the angle of the bent part 522 is not changed, that is, if the bent part 522 maintains 0° approximately parallel to the horizontal direction, the bent part 522 is inserted into the slot 514. If the angle of the bent part 522 is changed, for example, if the angle of the bent part 522 with respect to the horizontal direction deviates from about 0° or if the bent part 522 is bent, the bent part 522 inserted into the slot 514 is gradually detached from the slot 514.

The locking element 530 is disposed above the latch 520. A part of the locking element 530 is accommodated in the holder 510 and supported by the holder 510, while the other part of the locking element 530 protrudes to the outside of the holder 510. In particular, the locking element 530 is supported on the bent part 522. One side of the locking element 530 includes a locking button part 532, and the locking button part 532 protrudes to the outside of the holder 510 farther than the other side of the locking element 530. Therefore, as described later, the locking button part 532 may be disposed at a position capable of contacting the contact part 354.

The release element 540 is inserted in the locking element 530. A part of the release element 540 is accommodated in the holder 510, while the other part of the release element 540 protrudes to the outside of the holder 510. One side of the release element 540 includes a release button part 542, and the release button part 542 refers to one portion of the release element 540 protruding to the outside of the holder 510 farther than the holder 510. Therefore, like the locking button part 532, the release button part 542 may also be disposed at a position capable of selectively contacting the contact part 356.

The release element 540 includes one or more fitting protrusion 544. The fitting protrusion 544 is formed on the lower portion of the release element 540 and positioned inside the holder 510. The fitting protrusion 544 may be formed in a tapered shape. The fitting protrusion 544 is formed to be insertable into the insertion part 524.

Referring back to FIG. 5, the locking assembly 500 is supported by the main valve assembly 200. The main valve assembly 200 is formed to block the flow between the fuel tank side passage 111 and the canister side passage 112, and to communicate them, as desired. The main valve assembly 200 may include a driving plate 210, a driving spring 220, a valve 230, a packing member 240, and a valve spring 250.

The main valve assembly 200, in particular, the driving plate 210 supports the locking assembly 500. According to an implementation example of the present disclosure, the holder 510 may be supported on the driving plate 210, and the latch 520 may be coupled to the driving plate 210. Therefore, the driving plate 210 is configured to move together with the locking assembly 500.

The driving plate 210 may become a reference dividing the housing into the upper housing 120 and the lower housing 110. In other words, an upper side of the driving plate 210 is provided with the bobbin assembly 300 and the locking assembly 500, and the main valve assembly 200 is disposed on a lower side of the driving plate 210. A diaphragm 212 is connected to a circumference of the driving plate 210, and the other side of the diaphragm 212 seats the core 210. The diaphragm 212 prevents foreign matters from flowing into the core 310.

The driving plate 210 includes a vent hole 214. The vent hole 214 is formed to fluidly communicate the upper side of the driving plate 210 with the lower side of the driving plate 210, that is, the bobbin assembly 300 side with a space between the driving plate 210 and the valve 230.

Meanwhile, a mesh filter 216 is mounted on the driving plate 210. Air from the bobbin assembly 300 or the core 310 passes through the vent hole 214, is filtered through the mesh filter 216, and discharged to the outside.

The driving plate 210 is supported by the driving spring 220 disposed under the driving plate 210. The driving spring 220 is stretched when the locking assembly 500 moves upward to provide a force at which the driving plate 210 and the locking assembly 500 may move upward.

The valve 230 is disposed under the driving plate 210 and the driving spring 220. When an external force, for example, an upward force is applied to the driving plate 210, the valve 230 may be separated from the driving plate 210.

When the driving plate 210 and the valve 230 are separated from each other, a fluid may flow between the driving plate 210 and the valve 230. To this end, according to an implementation example of the present disclosure, the valve 230 includes an orifice 232 formed axially in the valve 230. The orifice 232 is disposed to be contactable with the driving plate 210. When the driving plate 210 is away from the orifice 232, ventilation is possible between the driving plate 210 and the inside of the valve 230.

Further, according to an implementation example of the present disclosure, the packing member 240 allowing airtightness to be maintained between the driving plate 210 and the orifice 232 may be disposed between the driving plate 210 and the orifice 232. For example, the packing member 240 may be a surface made of a sealing material, which allows airtightness to be maintained, integrated with the driving plate 210.

The valve 230 is provided at a position of blocking the flow between the fuel tank side passage 111 and the canister side passage 112 in the lower housing 110. According to an implementation example of the present disclosure, the fuel tank side passage 111 is formed above the canister side passage 112, and disposed to close a stepped portion formed between the fuel tank side passage 111 and the canister side passage 112. A valve seating part 116 on which the valve 230 is seated may be provided in the lower housing 110. When the valve 230 is seated on the valve seating part 116, the flow between the fuel tank side passage 111 and the canister side passage 112 is blocked.

Further, the valve 230 may include the packing member 234. The packing member 234 is mounted on a lower end of the valve 230 and disposed to closely contact the valve seating part 116. The packing member 234 may maintain the airtightness between the valve 230 and the valve seating part 116. The valve spring 250 is accommodated under the valve 230 in the lower housing 110. The valve spring 250 provides an upward force to the valve 230.

Figure 5:
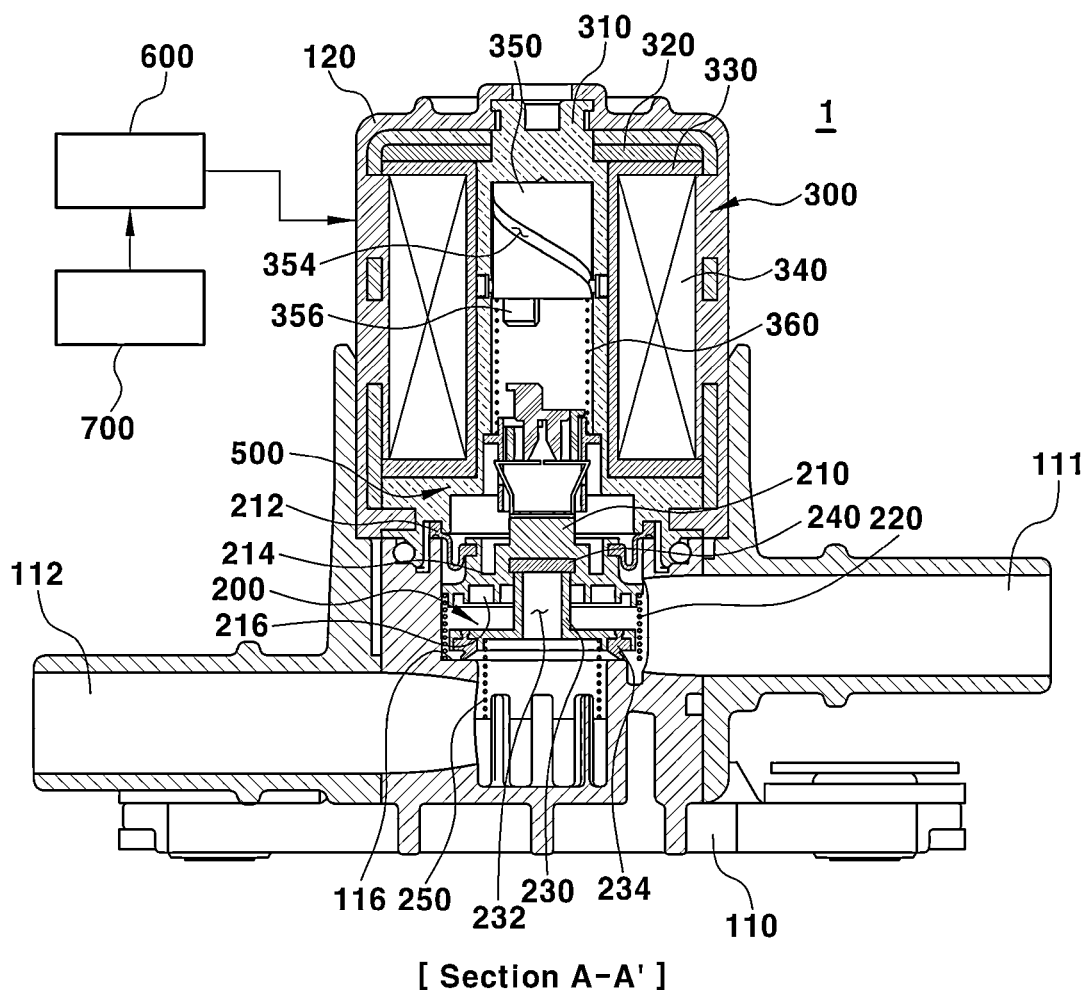
FIG. 5 illustrates a cross-sectional diagram taken along line A-A' in FIG. 3.
Figure 6:
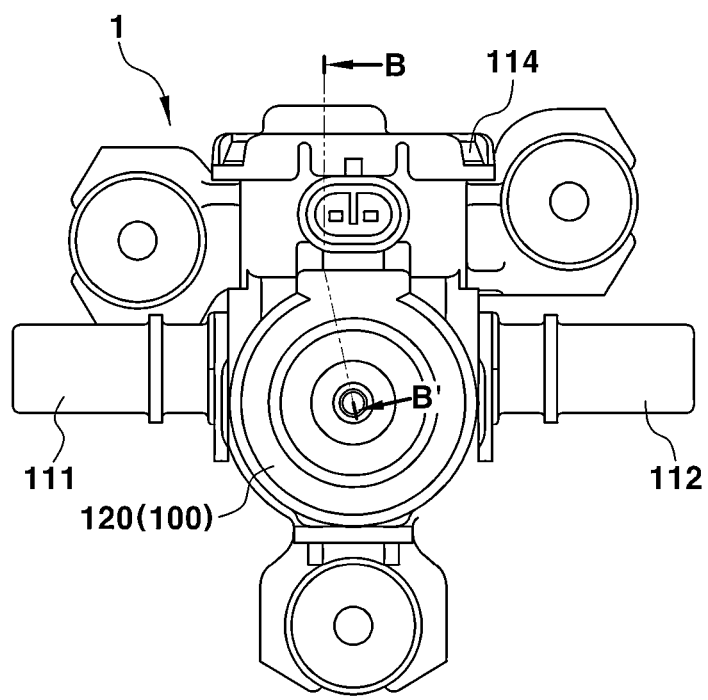
FIG. 6 is a plan view of FIG. 3.

Continuously referring to FIG. 5, the isolation valve 1 according to the present disclosure may receive power from an energy storage part 600, such as the auxiliary battery for the vehicle. In particular, a controller 700 allows a current to be supplied from the energy storage part 600 to the coil 340 when desired. The core 310 and the plunger 350 are magnetized by a magnetic field generated by the supplied current, and the plunger 350 moves downward along the space 312.

Hereinafter, an operation of the locking assembly 500 in conjunction with the movement of the plunger 350 will be described with reference to FIGS. 13A to 13E and FIGS. 14A to 14C.

Figure 13A:
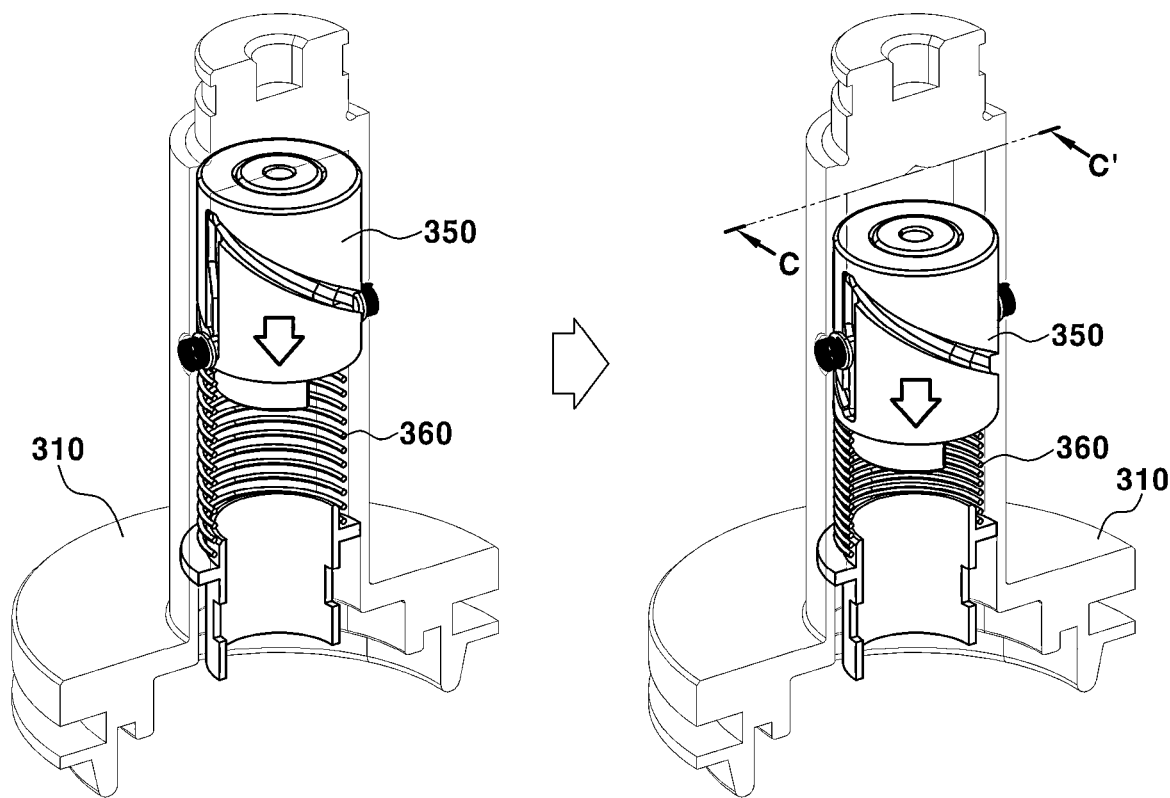
FIGS. 13A and 13C illustrate a downward operation of the plunger according to an embodiment of the present disclosure.

As illustrated in FIG. 13A, the isolation valve 1 in the closed position is positioned on an upper end of the space 312 in the core 310. When power is supplied to the isolation valve 1 from the energy storage part 600, the plunger 350 starts to move downward. When the plunger 350 moves downward, the guide pin 370 moves upward along the vertical path 1354.

Figure 13B:
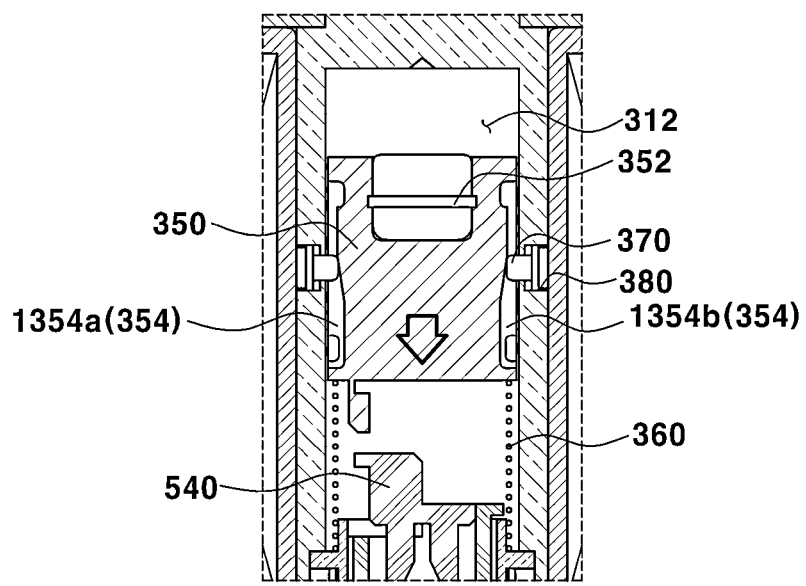
FIG. 13B is a cross-sectional diagram taken along line C-C' of FIG. 13A.

As illustrated in FIG. 13B, when the plunger 350 moves downward, the guide pin 370 moves from the lowest point of the vertical path 1354 toward the highest point of the vertical path 1354. The depth of the guide groove 354 generally decreases from the lowest point toward the highest point on the vertical path 1354 by the inclination formed on the vertical path 1354. As described above, the change in the depth may be absorbed by the guide pin 370 and the guide pin spring 380.

Figure 13C:
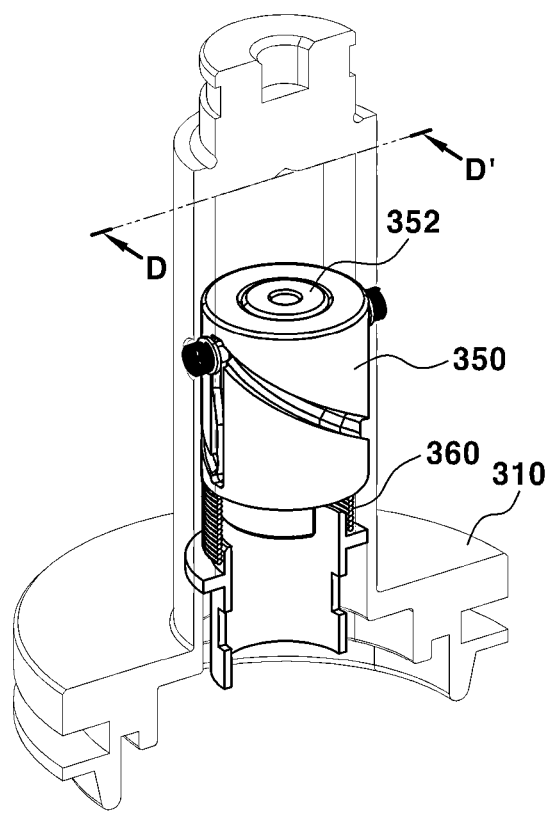
Figure 13D:
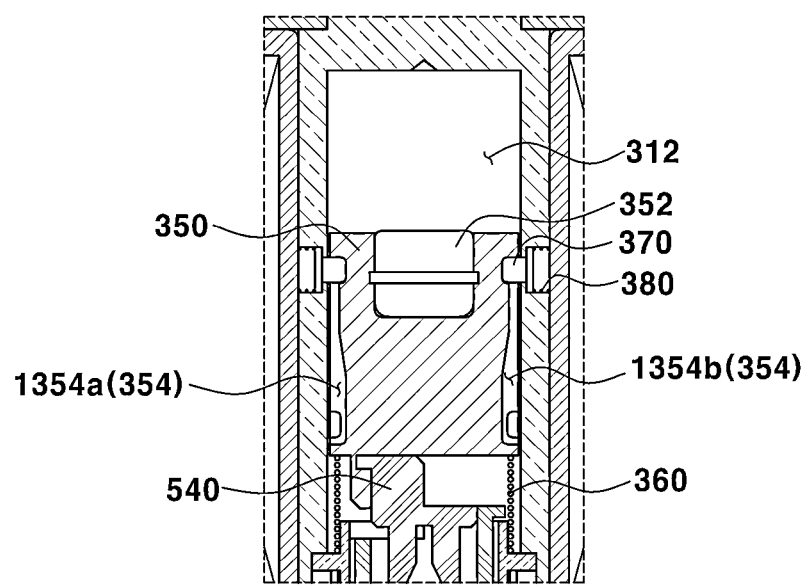
FIG. 13D is a cross-sectional diagram taken along line D-D' of FIG. 13C.

As illustrated in FIGS. 13C and 13D, when the guide pin 370 finishes moving along the vertical path 1354, the guide pin 370 reaches the highest point of the vertical path 1354. As the depth of the guide pin 354 is large on the highest point, the guide pin 370 is incapable of moving back to the vertical path 1354 on which the guide pin 370 has moved previously and moves along the inclined path 2354.

Referring to FIGS. 14A to 14C and FIGS. 15A and 15B, when the plunger 350 moves downward, the locking assembly 500 is operated. In particular, the plunger 350 moving downward from the closed position of the isolation valve 1 of FIG. 13A presses the release element 540 of the locking assembly 500, thereby switching the isolation valve 1 to the opened position. Specifically, the plunger 350 moves downward to compress to the return spring 360, and the contact part 356 starts to pressurize the release button part 542 of the release element 540 (see FIG. 14A). The fitting protrusion 544 starts to be inserted into the insertion part 524 of the latch 520 while the release button part 542 is continuously pressed by the contact part 356 (see FIGS. 14B and 15A). The fitting protrusion 544 pulls the latch 520 into the holder 510 as being inserted into the insertion part 524. Therefore, the bent part 522 is completely detached from the slot 514 as the bending angle of the bent part 522 inserted into the slot 514 is changed (see FIGS. 14C and 15B). As the latch 520 is detached from the slot 514, the driving plate 210 coupled to the lower portion of the latch 520 moves upward by a restoring force of the driving spring 220 thereunder, and the locking assembly 500 coupled to the driving plate 210 also moves upward.

Figure 13E:
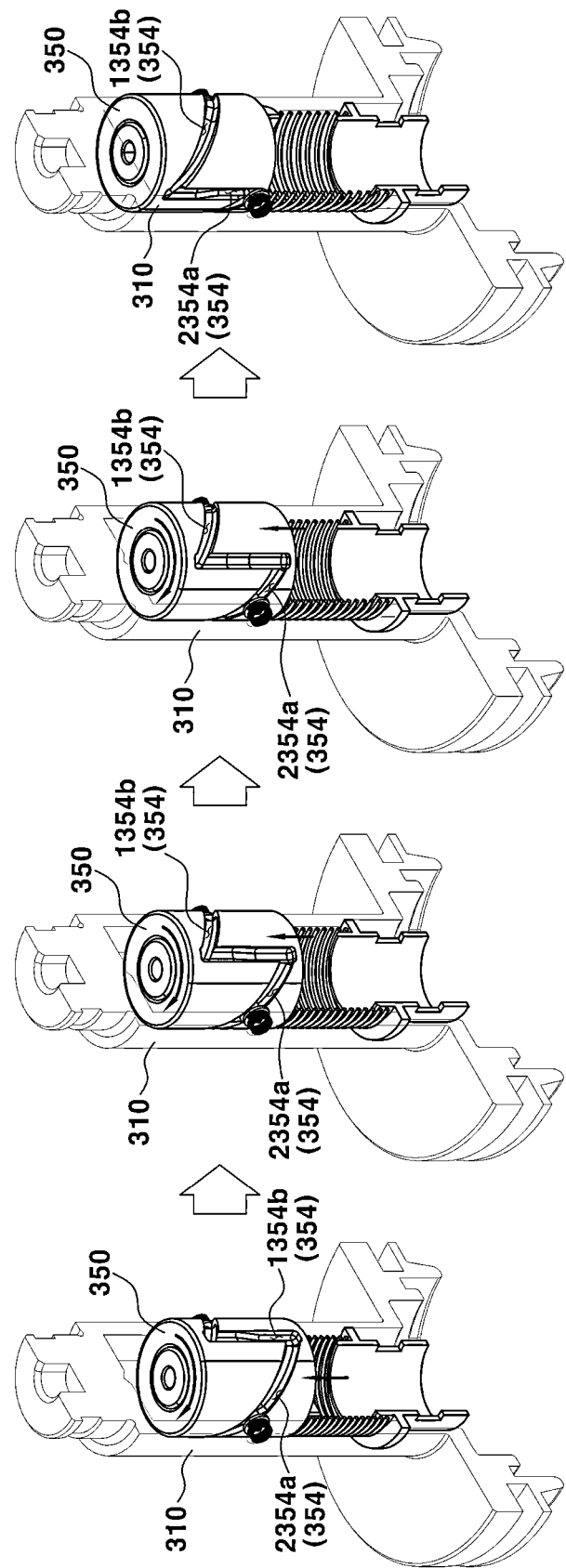
FIG. 13E illustrates an upward operation of the plunger according to an embodiment of the present disclosure.
Figure 14A:
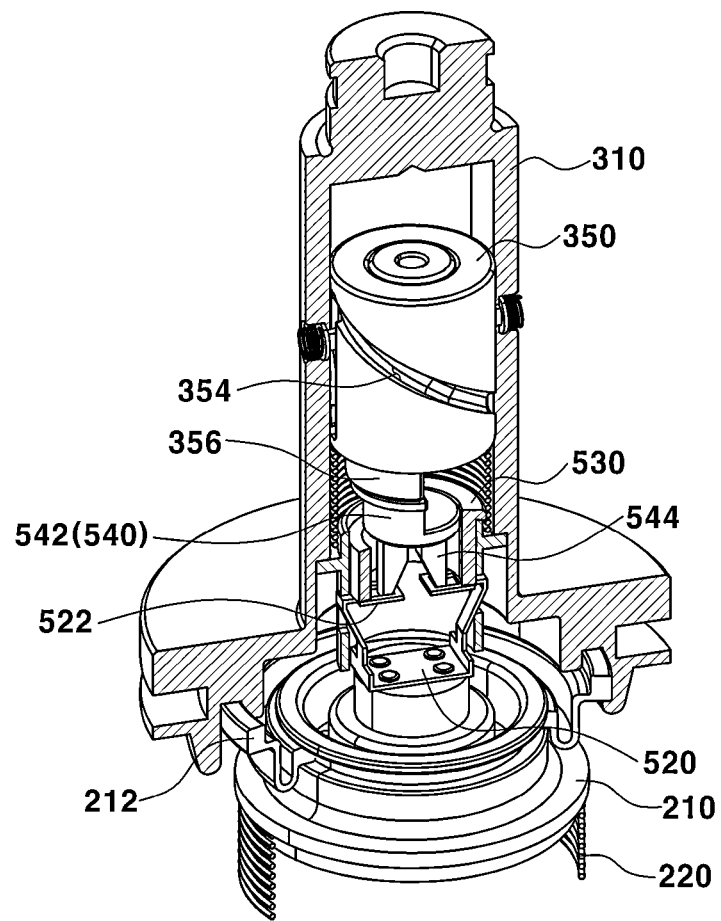
FIGS. 14A to 14C illustrate a state where the plunger is operated in conjunction with the locking assembly and the main valve assembly upon the downward operation of the plunger according to an embodiment of the present disclosure in order to open the isolation valve.
Figure 14B:
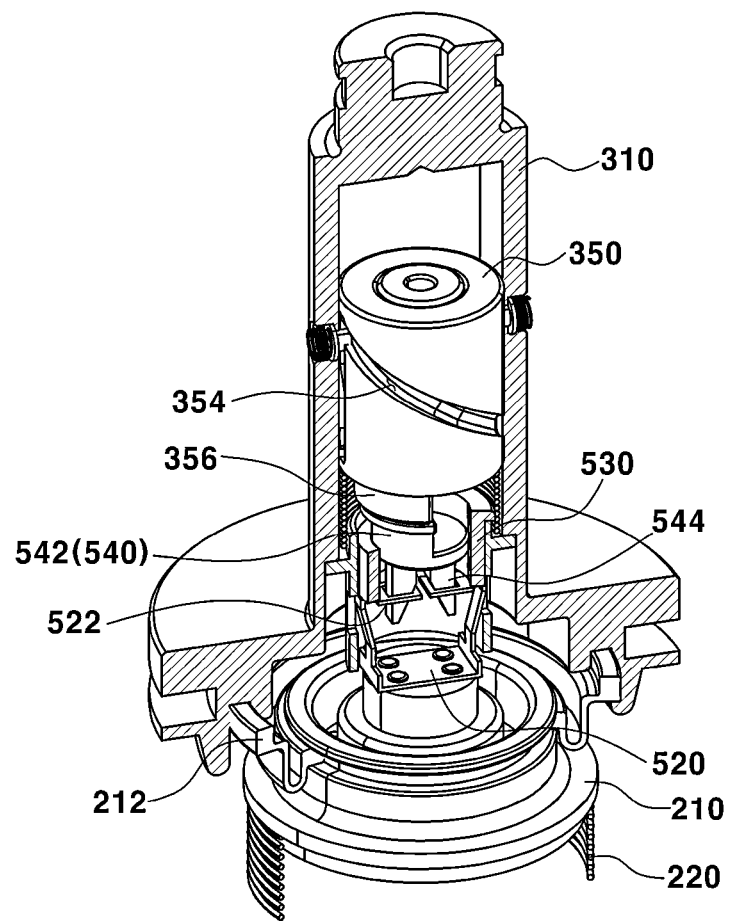
Figure 14C:
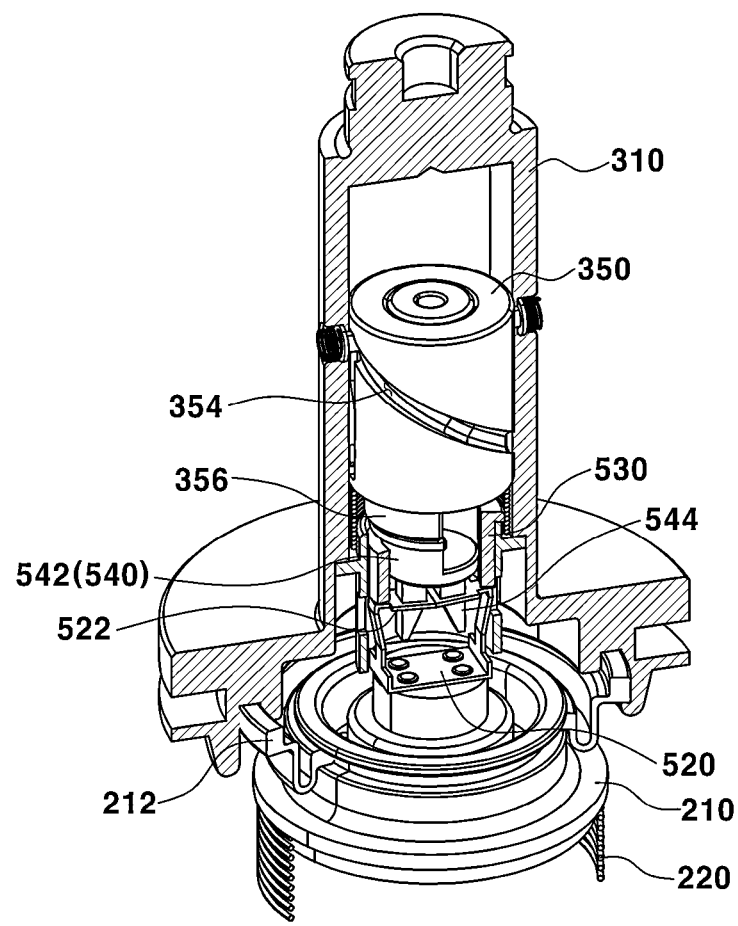
Figure 15A:
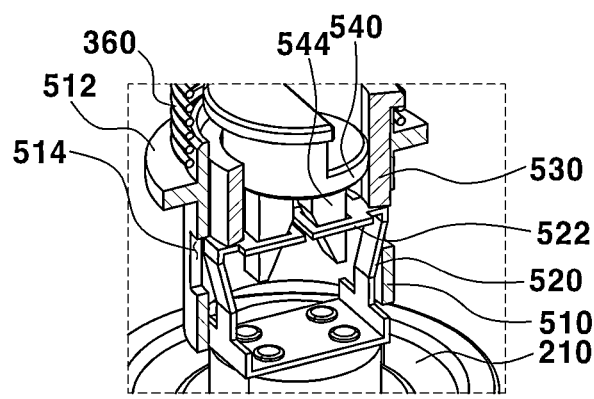
FIG. 15A illustrates a state when a release element of the locking assembly according to an embodiment of the present disclosure is pressed.
Figure 15B:
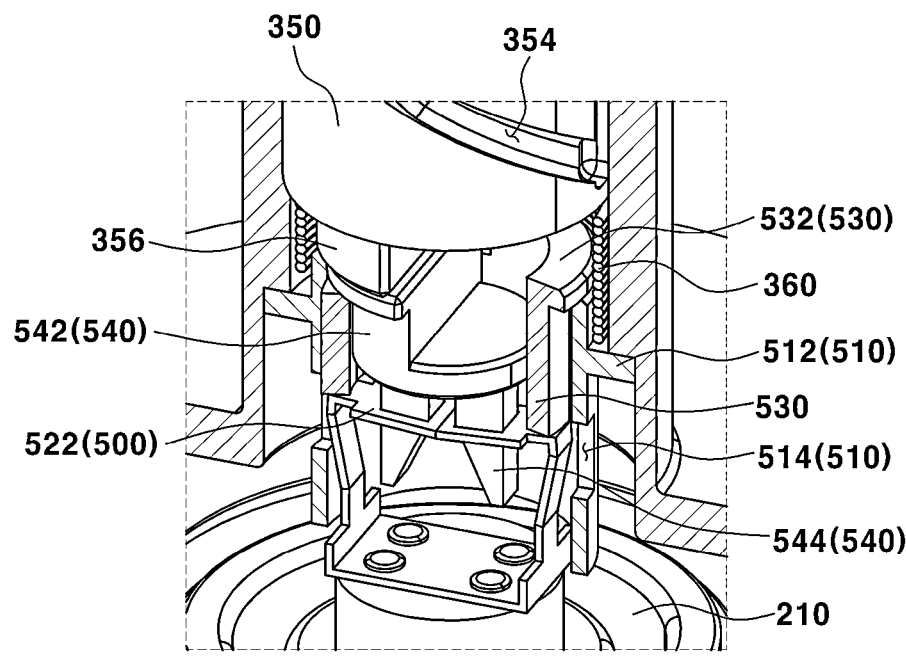
FIG. 15B illustrates a state where the release element of the locking assembly according to an embodiment of the present disclosure is completely pressed, thereby detaching a latch from a slot.

As illustrated in FIG. 13E, as described above, power is discontinued in the state where the isolation valve 1 is opened, and the plunger 350 returns to an original position by moving upward in the space 312. The guide pin 370 is guided along the inclined path 2354, and the plunger 350 rotates, as indicated by the arrow, by the guide pin 370 guided to the inclined path 2354. Therefore, for example, the guide pin 370 illustrated on the left of the drawing moves from the first vertical path 1354*a* to the second vertical path 1354*b* via the first inclined path 2354*a*, upon one-time reciprocal movement in which the plunger 350 moves downward and upward. Meanwhile, the guide pin 370 illustrated on the right of the drawing moves from the second vertical path 1354*b* to the first vertical path 1354*a* via the second inclined path 2354*b*, upon one reciprocal motion of the plunger 350. When the plunger 350 reciprocally moves, each guide pin 370 moves to the other vertical path 1354 on the opposite side, and the plunger 350 rotates by about 180°. Therefore, after the plunger 350 completely rotates, the contact part 356 moves to the position rotated by about 180° compared to before rotation.

When the contact part 356 moves to the rotated position, the locking assembly 500 may be operated to close the isolation valve 1.

Figure 16A:
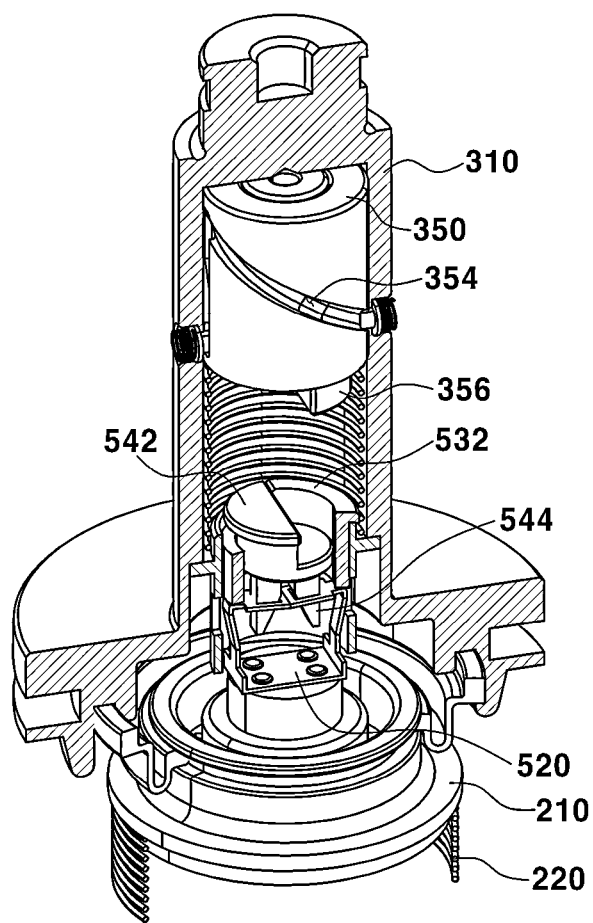
FIGS. 16A to 16C illustrate a state where the plunger is operated in conjunction with the locking assembly and the main valve assembly upon the downward operation of the plunger according to an embodiment of the present disclosure in order to close the isolation valve.
Figure 16B:
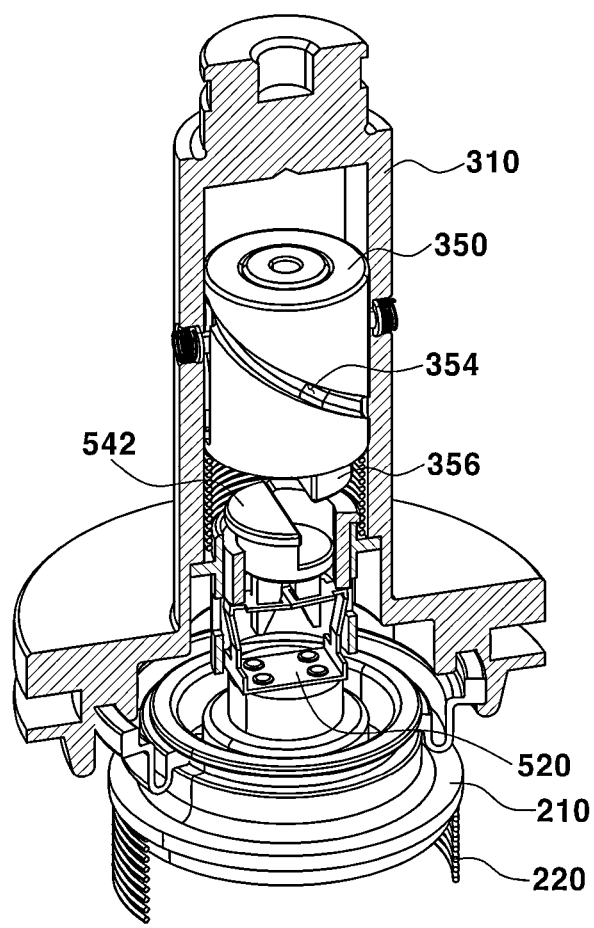

As illustrated in FIGS. 16A and 16B, when power is re-supplied to the coil 340 by the energy storage part 600, the plunger 350 moves downward along the guide groove 354 at the position rotated by 180° as described above to close the valve 230.

Figure 16C:
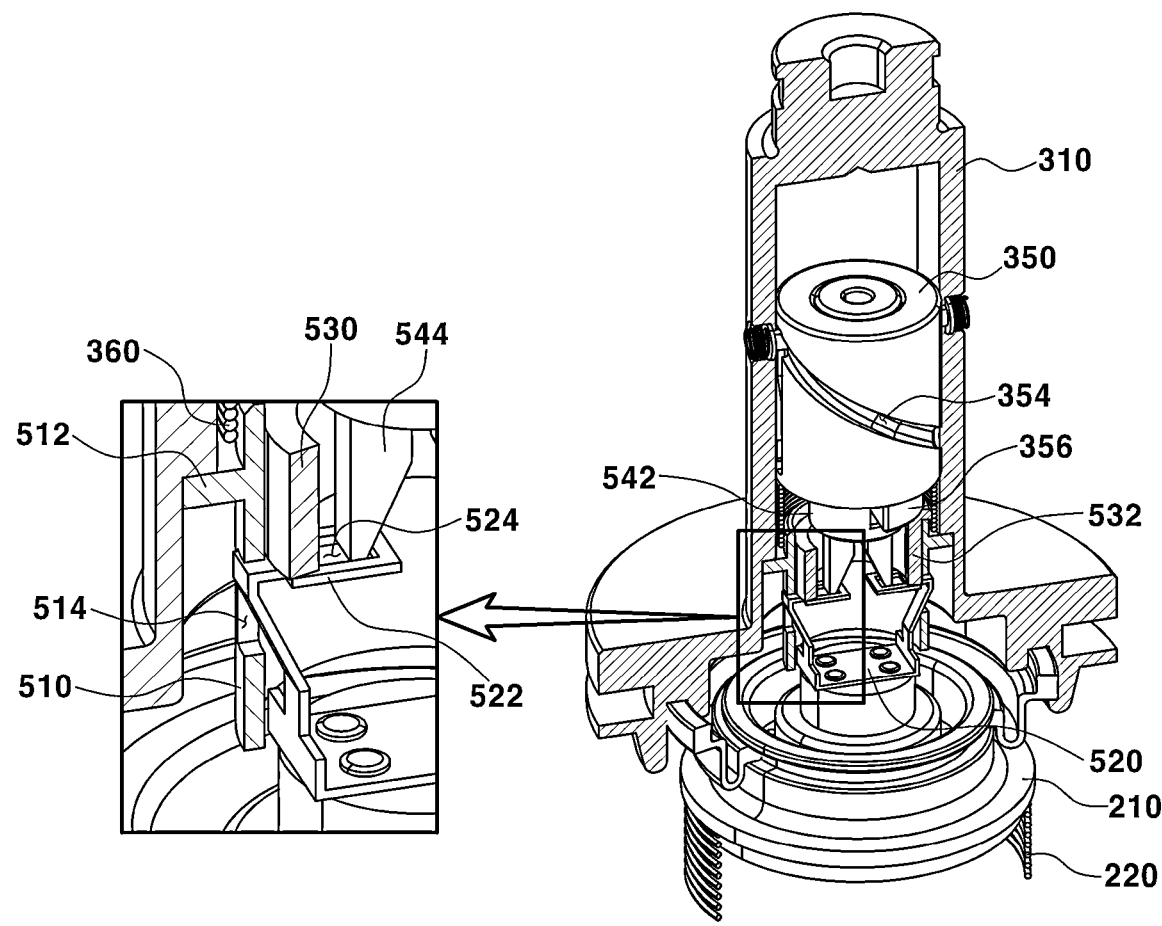

As illustrated in FIG. 16C, the contact part 356 starts to press the locking button part 532 of the locking element 530 by the plunger 350 moving downward. The locking element 530 inserts the bent part 522 into the slot 514 by unfolding the bent part 522, which was bent, to both sides as the locking button part 532 is continuously pressed by the contact part 356. At the same time, the fitting protrusion 544 is detached from the insertion part 524 of the latch 520. The locking element 530 presses the latch 520, and the bent part 522 of the latch 520 is inserted into the slot 514 while becoming a state of being parallel to the horizontal direction again. The driving plate 210 is pressed downward again due to the downward movement of the locking assembly 500, the driving spring 220 is compressed, and the valve 230 moves downward and is closed.

Switching from the closed state to the opened state of the isolation valve 1 will be comprehensively described with reference to FIGS. 17A to 17F.

Figure 17A:
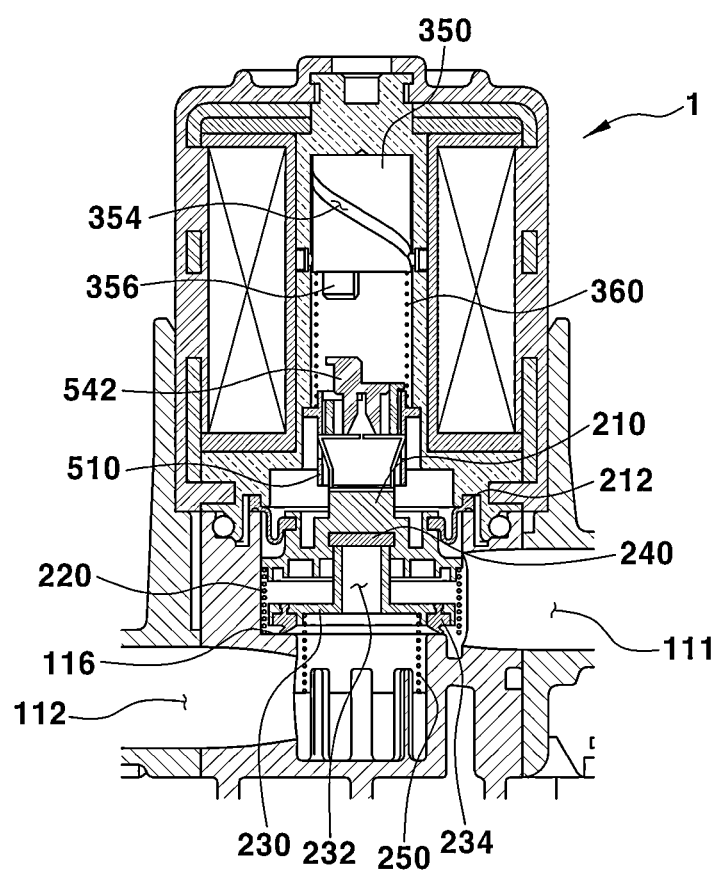
FIGS. 17A to 17F illustrate an opening operation process of the isolation valve according to an embodiment of the present disclosure.

As illustrated in FIG. 17A, when the isolation valve 1 is in the closed state, the fuel tank side passage 111 and the canister side passage 112 are isolated from each other. The plunger 350 is positioned on the upper portion of the space 312 in the core 310, and the contact part 356 is aligned to be parallel to the upper side of the release button part 542 of the release element 540.

Figure 17B:
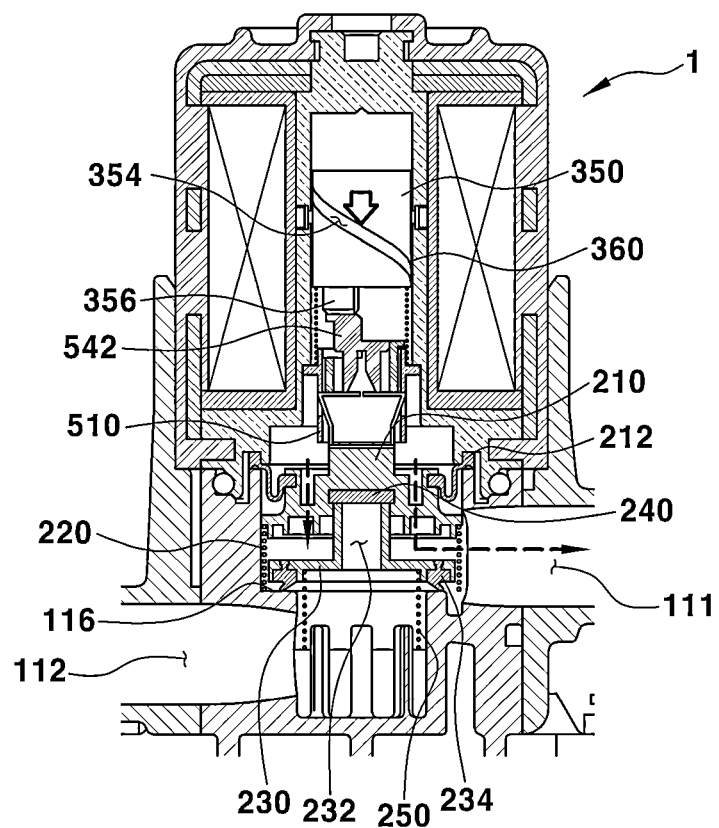

Referring to FIG. 17B, when power is applied to the coil 340, the plunger 350 moves downward along the space 312. As the contact part 356 and the release button part 542 of the release element 540 start to contact each other, the release element 540 also starts to move downward. As the locking assembly 500 is pressed, the air on the upper portion of the diaphragm 212 moves to the outside through the vent hole 214 of the driving plate 210 and the mesh filter 216 on the lower portion of the driving plate 210.

Figure 17C:
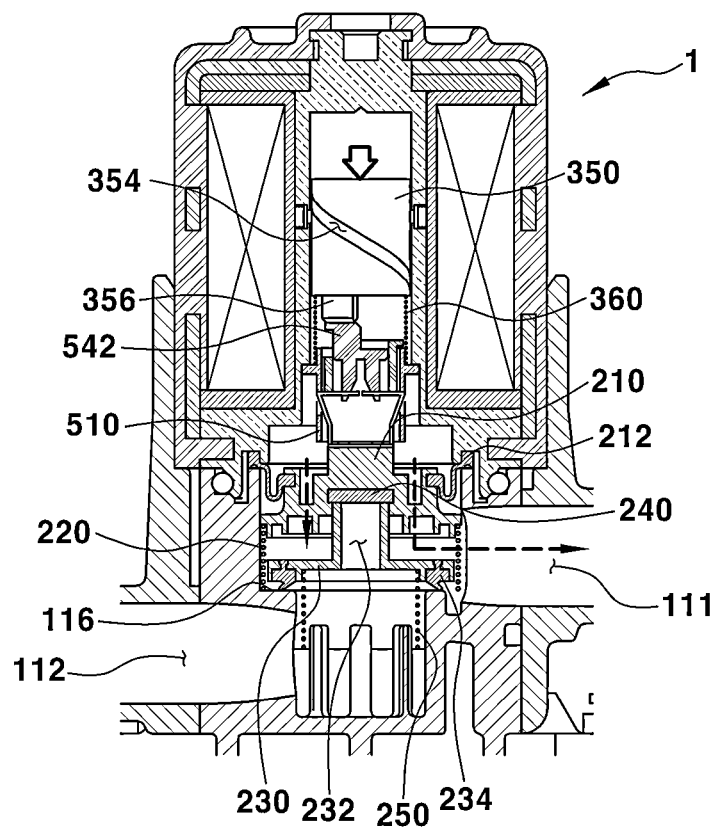

As illustrated in FIG. 17C, the fitting protrusion 544 is inserted into the insertion part 524 of the latch 520 as the release element 540 gradually moves downward. The latch 520 is deformed inward by inserting the fitting protrusion 544.

Figure 17D:
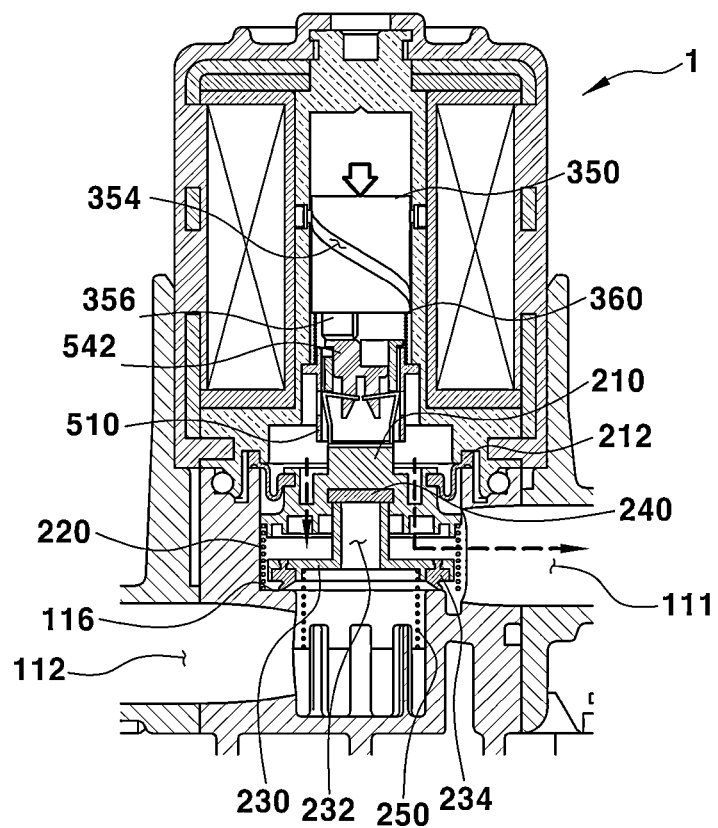

As illustrated in FIG. 17D, when the fitting protrusion 544 is completely inserted into the insertion part 524, the latch 520 is deformed into the holder 510 and completely separated from the slot 514. Since the latch 520 fixing the locking assembly 500 is detached from the slot 514, the locking assembly 500 starts to receive an upward force. Further, the driving plate 210 coupled to the locking assembly also moves upward. The upward movement of the locking assembly 500 and the driving plate 210 is facilitated by the restoring force of the driving spring 220 compressed on the lower portion of the driving plate 210.

Figure 17E:
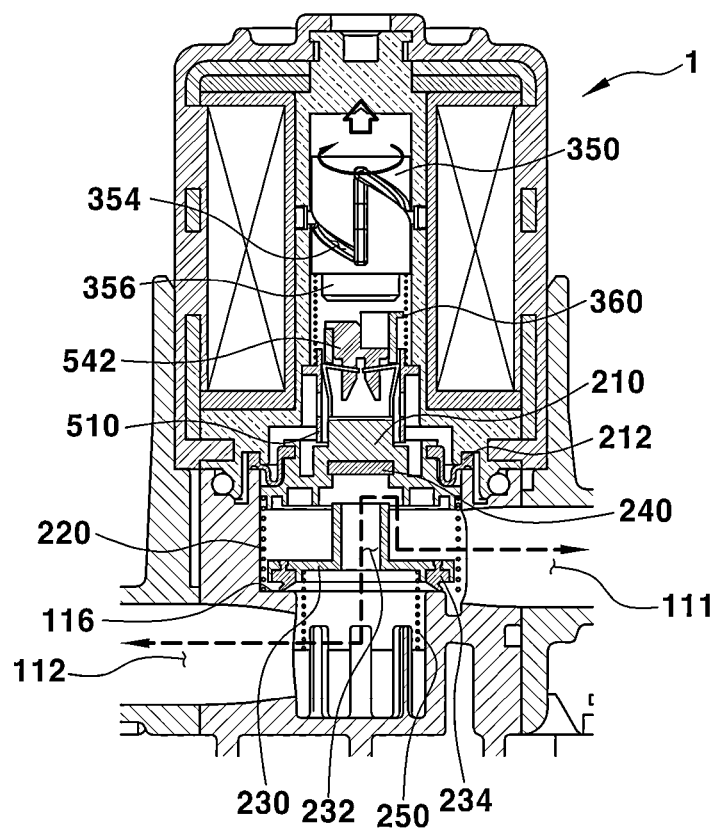

As illustrated in FIG. 17E, as the driving plate 210 moves upward, the driving plate 210 and the valve 230 are separated from each other. As the driving plate 210 moves upward by the driving spring 220, parts of the fuel tank side passage 111 and the canister side passage 112 start to ventilate by the orifice 232 through the passage formed between the driving plate 210 and the valve 230. As described above, the present disclosure may be provided with the orifice 232, which gradually enables the ventilation between the fuel tank side passage 111 and the canister side passage 112, thereby preventing the pressure from rapidly decreasing.

Meanwhile, when the unlocking is completed by pressing the release element 540, the power supply to the isolation valve 1 is ceased. When the power supply to the coil 340 is discontinued, the plunger 350 starts to move upward along the space 312 by the return spring 360. As the plunger 350 moves upward, the plunger 350 rotates by the inclined path 2354 of the guide groove 354.

Figure 17F:
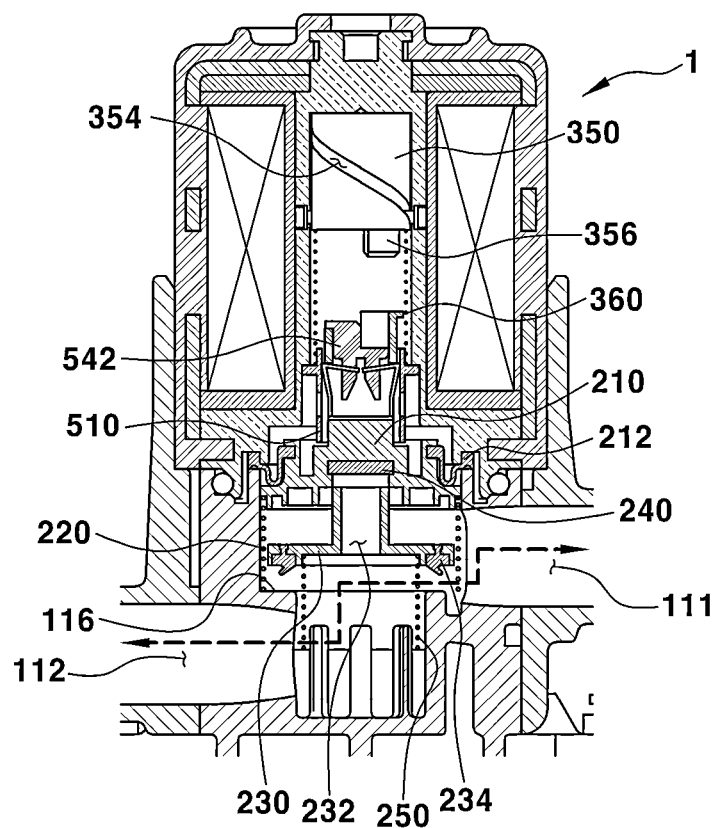

As illustrated in FIG. 17F, the contact part 356 of the plunger 350 which finished moving upward is positioned at a position aligned with the locking button part 532 due to the rotation. When the pressure of the fuel tank 11 is smaller than the force of the valve spring 250, the valve spring 250 lifts the valve 230 upward due to the upward movement to completely open the valve 230. Therefore, the fuel tank side passage 111 and the canister side passage 112 ventilate.

Switching from the opened position to the closed position of the isolation valve 1 will be comprehensively described with reference to FIGS. 18A to 18E.

In the state of FIG. 17F, a ventilation state between the fuel tank 11 and the canister 12 is the opened position. At this time, the contact part 356 is aligned on the upper portion of the locking button part 532 of the locking assembly 500.

Figure 18A:
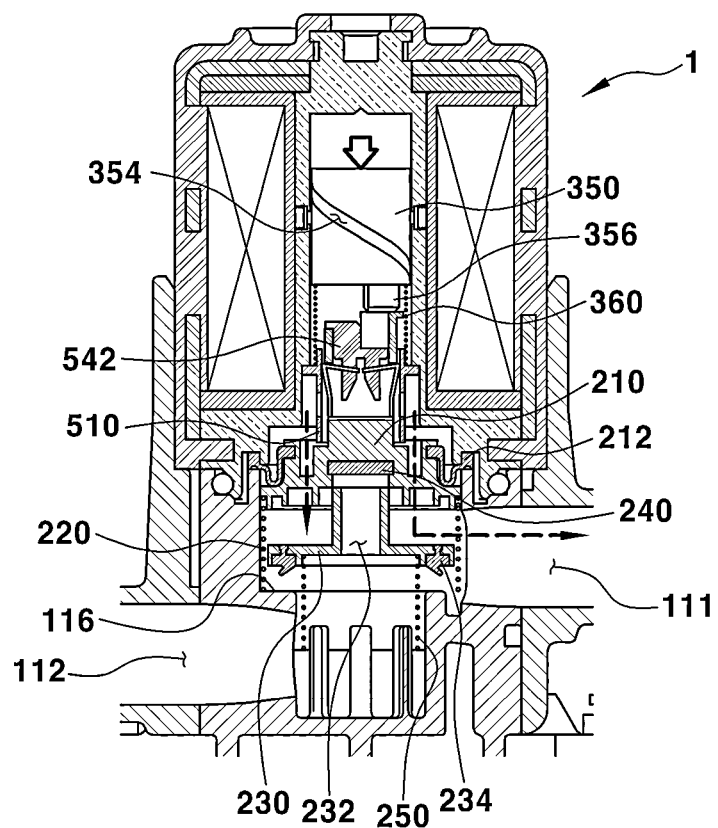
FIGS. 18A to 18D illustrate a closing operation process of the isolation valve according to an embodiment of the present disclosure.

As illustrated in FIG. 18A, when the power is applied to the coil 340, the plunger 350 moves downward again, and the plunger 350 starts to contact the locking button part 532. In particular, the contact part 356 of the plunger 350 starts to press the locking button part 532. This is because the contact part 356 is in a state capable of contacting the locking button part 532 when the plunger 350 linearly moves downward because the plunger 350 rotates when the isolation valve 1 moves from the closed position to the opened position. As the plunger 350 moves downward, the air on the upper portion of the diaphragm 212 moves to the outside through the vent hole 214 and the mesh filter 216 as indicated by the arrow.

Figure 18B:
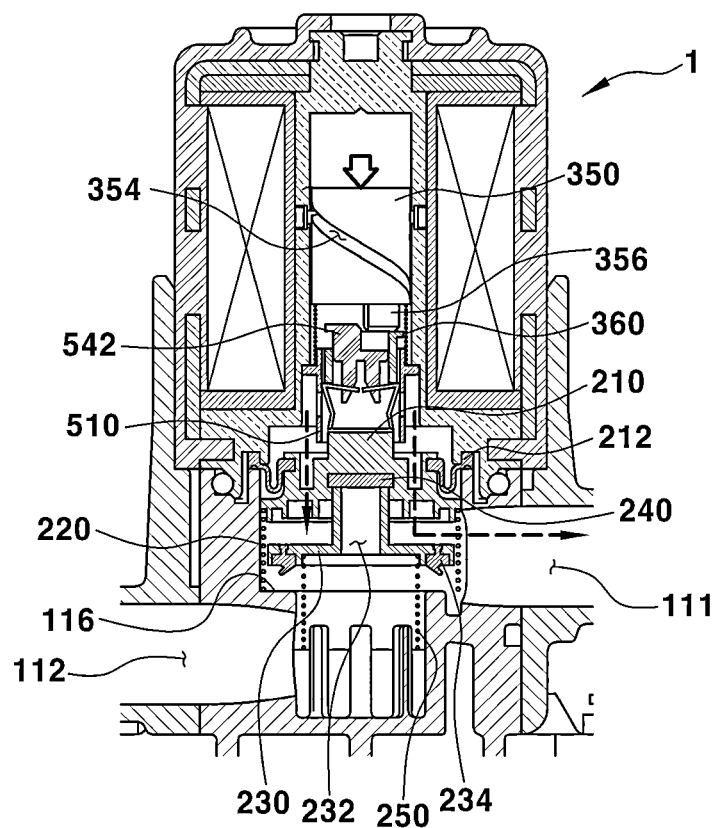

As illustrated in FIG. 18B, the contact part 356 moves the locking assembly 500 downward while continuously pressing the locking button part 532. Therefore, the driving plate 210 integrally formed with the locking assembly 500 moves downward. A sealing surface of the driving plate 210 or the packing member 240 forces the orifice 232 of the valve 230 to be hermetically sealed while contacting the orifice of the valve 230. Further, the fitting protrusion 544 inserted into the insertion part 524 of the latch 520 starts to be detached by the pressing of the locking element 530 by the contact part 356.

Figure 18C:
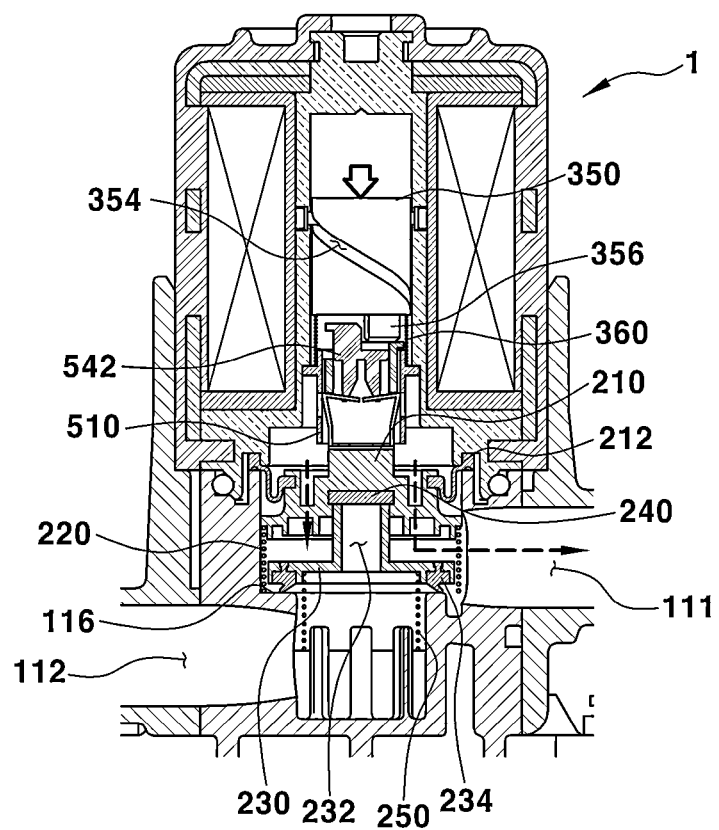

As illustrated in FIG. 18C, the plunger 350 moves to the lowest movable point. As the locking button part 532 moves to the end and the angle of the bent part 522 of the latch 520 is changed, the latch 520 is inserted into the slot 514. In this process, the fitting protrusion 544 exits from the insertion part 524, and the driving plate 210 presses the valve 230 to completely close the valve 230. Therefore, the isolation valve 1 completes switching from the opened position to the closed position.

Figure 18D:
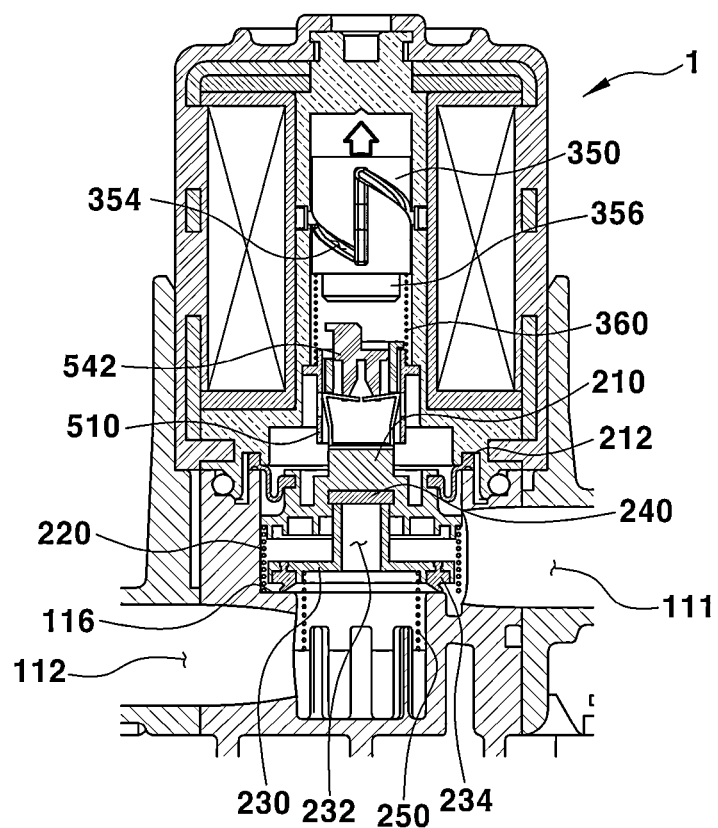

As illustrated in FIG. 18D, when the valve 230 closely contacts the valve seating part 116 to close the valve 230, the controller 700 ends the power supply from the energy storage part 600. When the power supply to the coil 340 is ended, the plunger 350 moves upward by the return spring 360.

Likewise at this time, the plunger 350 moves upward while rotating along the inclined path 2354. Therefore, again, the guide pin 370 illustrated on the left of the drawing is positioned on the first vertical path 1354a, and the guide pin 370 illustrated on the right thereof returns to the second vertical path 1354b. When the power is applied next time, the contact part 356 of the plunger 350 is positioned above the release element 540, and the contact part 356 and the release button part 542 are in a state of FIG. 17A aligned in the axial direction of the plunger 350 such that the valve 230 may be switched from the closed state to the opened state.

Figure 19:
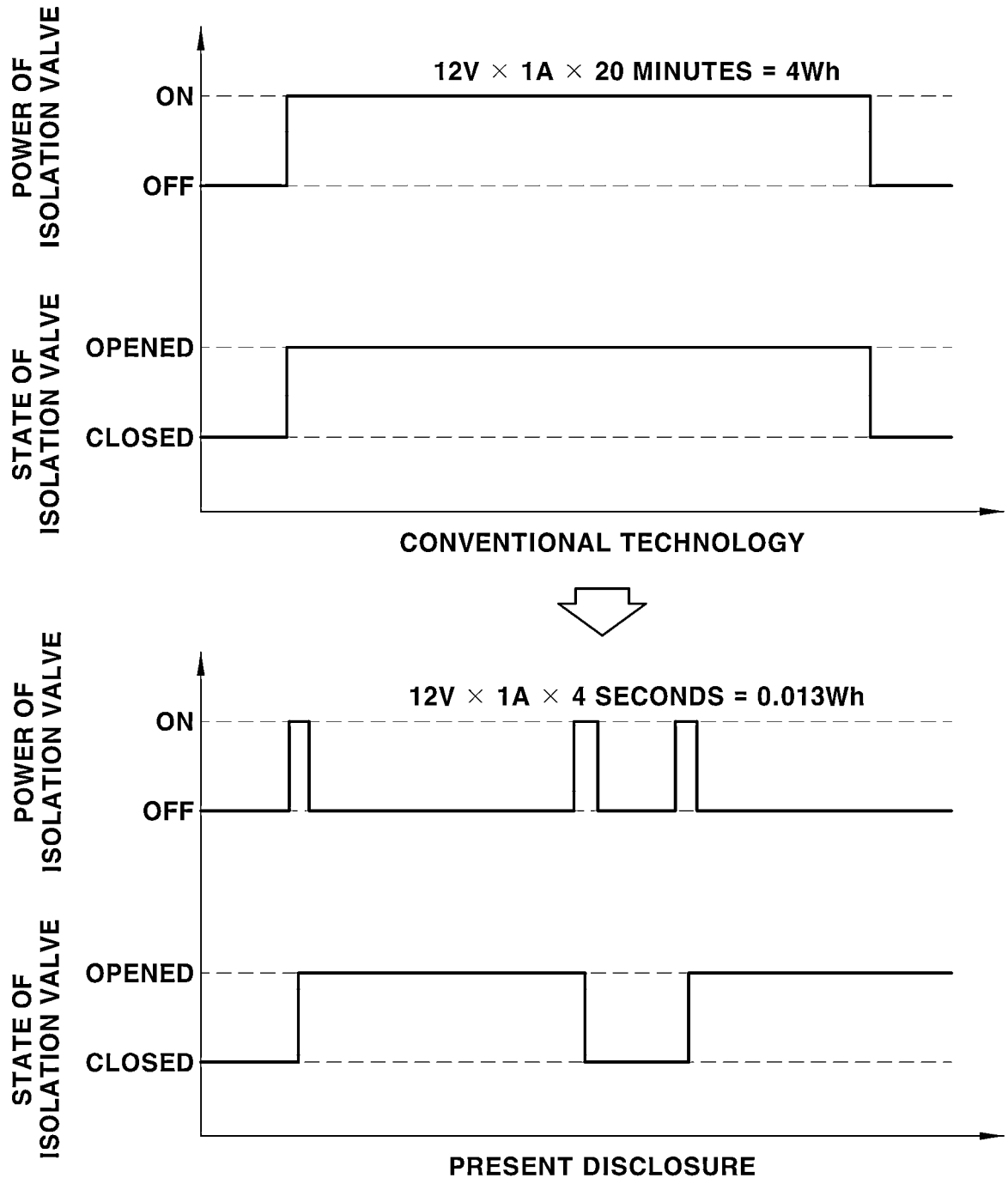
FIG. 19 illustrates an opened or closed state of the isolation valve according to application of power to the isolation valves according to the related art and the present disclosure.

As illustrated in FIG. 19, according to the present disclosure, the closed or opened state of the isolation valve 1 may be maintained even after the power supply is ended, thereby largely decreasing power consumption. This may contribute to improving fuel efficiency and solve a discharge problem of the auxiliary battery.

For example, the conventional isolation valve consumes power of about 4 Wh (Watt-hour) upon operation (voltage 12 volts (V), consuming current 1 ampere (A), and operation for up to 20 minutes). The conventional isolation valve is required to continuously receive the power during operation. On the other hand, the present disclosure may maintain the opened state of the isolation valve 1 even if the power is applied for a very short time and ceased when the isolation valve 1 is opened. Therefore, it is possible to solve the problems, such as the discharge problem of the auxiliary battery and the risk of fire due to generated-heat.

The present disclosure may use the isolation valve 1 without limitation of the maximum opened time of the isolation valve 1, thereby overcoming the problem capable of occurring in the conventional isolation valve which is automatically closed after a certain time elapses.

Figure 20:
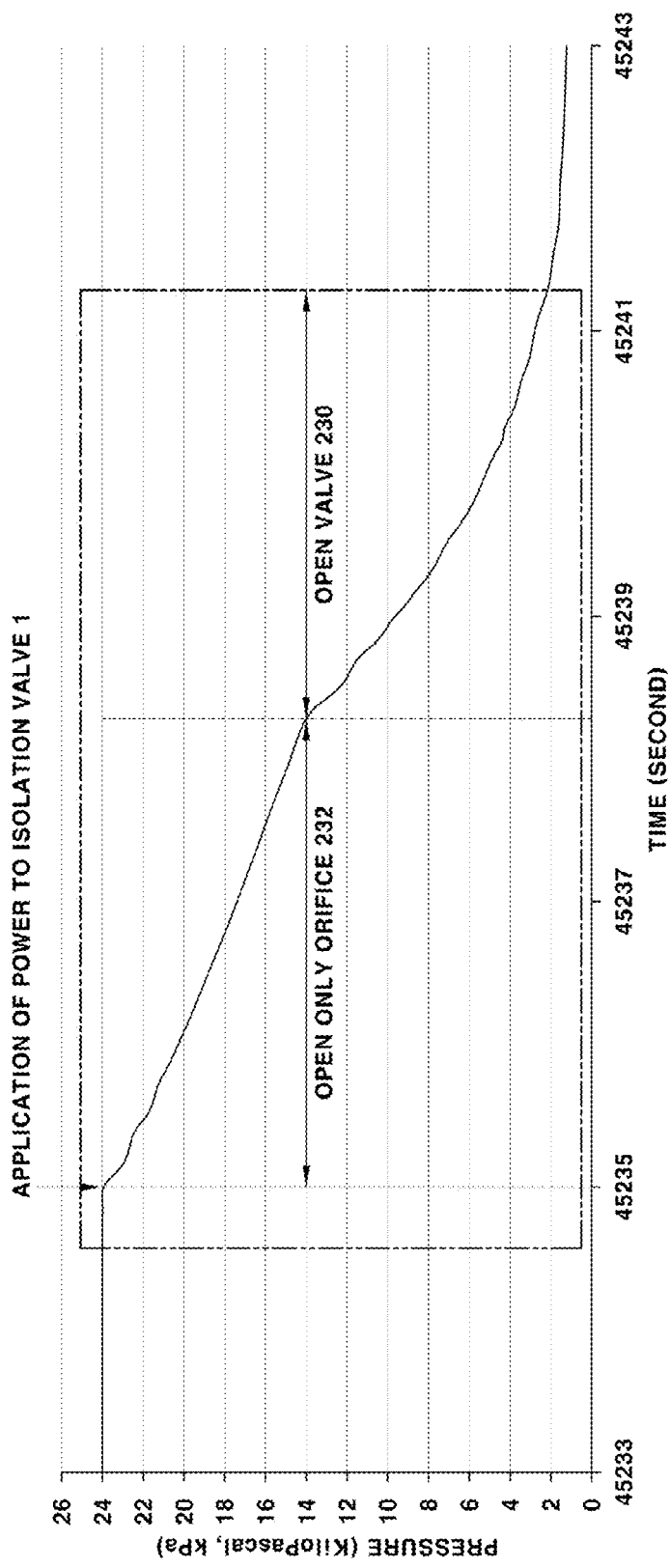
FIG. 20 illustrates a change in pressure over time when the isolation valve according to the present disclosure is opened.

As illustrated in FIG. 20, the isolation valve 1 according to forms of the present disclosure may include the two-stage opening structure, thereby inhibiting or preventing the pressure of the fuel tank from rapidly changing. According to the present disclosure, the ventilation through the orifice 232 is performed in advance at the initial opening of the isolation valve 1, thereby preventing the pressure of the fuel tank from being rapidly changed. It is possible to prevent the problems, such as clogging of the vent valve of the fuel tank due to the rapid reduction in the pressure (rapid increase in discharged flow rate) in the overpressure state of the fuel tank 11, the reduction in the flow rate of a fuel pump due to fuel cavitation, and ignition off.

The aforementioned present disclosure is not limited to the aforementioned exemplary embodiment and the accompanying drawings, and it is apparent to those skilled in the art to which the present disclosure pertains that various substitutions, modifications, and changes may be made without departing from the technical spirit of the present disclosure.

What is claimed is:

1. An isolation valve comprising:
   a housing comprising a first passage and a second passage different from the first passage;
   a main valve assembly comprising a valve disposed in the housing, wherein the valve is configured to selectively block a fluid flow between the first passage and the second passage;
   a locking assembly disposed in the housing, and comprising a release element configured to open the valve and a locking element configured to close the valve; and
   a bobbin assembly disposed in the housing and configured to operate the locking assembly, wherein the bobbin assembly comprises:
      a coil;
      a core disposed inside the coil and configured to form a space; and
      a plunger configured to move in the space by an electromagnetic field generated by the coil and to contact the locking assembly on an opened end side of the core,
   wherein the plunger is further configured to:
      linearly move from a closed end of the core toward an opened end of the core, and
      rotate by a preset angle upon movement from the opened end toward the closed end to selectively pressurize any one of the locking element and the release element of the locking assembly, wherein:
         when a first supply of power is provided to the coil in a closed position of the valve, the plunger moves from the closed end of the core to the opened end of the core and presses the release element to open the valve,
         when the first supply of power to the coil is ceased, the plunger returns to the closed end of the core and the valve stays open,
         when a second supply of power is provided to the coil in an opened position of the valve, the plunger moves from the closed end of the core to the opened end of the core and presses the locking element to close the valve, and
         when the second supply of power to the coil is ceased, the plunger returns to the closed end of the core and the valve stays closed.

2. The isolation valve of claim 1, wherein the isolation valve is disposed between a fuel tank and a canister of a vehicle, the first passage is configured to fluidly communicate with the fuel tank, and the second passage is configured to fluidly communicate with the canister.

3. The isolation valve of claim 1, further comprising: a compressible return spring interposed between the plunger and the locking assembly.

4. The isolation valve of claim 2, comprising:
   a chamber formed on one side of the housing, configured to fluidly communicate with the fuel tank by a flow path where a fluid flow is selectively blocked, the chamber including an exhaust hole; and
   a relief valve assembly accommodated in the chamber, the relief valve assembly including a positive pressure valve configured to block the fluid flow between the flow path and the chamber and a negative pressure valve disposed inside the positive pressure valve to allow the fluid flow in the flow path through the inside of the positive pressure valve upon opening,
   wherein the positive pressure valve is opened when an overpressure exceeding a preset positive pressure is formed in the fuel tank, and
   wherein the negative pressure valve is opened when an underpressure exceeding a preset negative pressure is formed in the fuel tank.

5. An isolation valve comprising:
   a housing comprising a first passage and a second passage different from the first passage;
   a main valve assembly comprising a valve disposed in the housing, wherein the valve is configured to selectively block a fluid flow between the first passage and the second passage;
   a locking assembly disposed in the housing, and comprising a release element configured to open the valve and a locking element configured to close the valve; and
   a bobbin assembly disposed in the housing and configured to operate the locking assembly,
   wherein the bobbin assembly comprises:
      a coil; and
      a core disposed inside the coil and configured to form a space; and
      a plunger configured to move in the space by an electromagnetic field generated by the coil and to contact the locking assembly on an opened end side of the core,
   wherein the plunger is further configured to:

linearly move from a closed end of the core toward an opened end of the core, and rotate by a preset angle upon movement from the opened end toward the closed end to selectively pressurize any one of the locking element and the release element of the locking assembly, and wherein the locking assembly further comprises:
a holder fixed to the core and including a slot; and
a latch fixed to the valve assembly, disposed inside the holder, detachably inserted into the slot, and deformable by an external force, wherein the locking element is configured to be seated on the latch inside the holder and to insert the latch into the slot upon pressing, and wherein the release element is disposed inside the locking element and is configured to deform the latch to detach the latch from the slot.

6. The isolation valve of claim 5, wherein the holder comprises: a flange part protruding radially outward from a circumference of the holder and configured to be fixed to an inner wall of the core.

7. The isolation valve of claim 5, wherein the latch comprises:
a bent part detachably inserted into the slot and configured to be deformed by the external force; and
an insertion part configured to receive a fitting protrusion of the release element.

8. The isolation valve of claim 5, wherein the locking element comprises: a locking button part protruding toward the closed end and formed on a first side of a cross section of the space, and wherein the release element comprises: a release button part protruding toward the closed end and formed on a second side opposite to the first side.

9. The isolation valve of claim 8, wherein the plunger comprises a contact part configured to protrude from only a part of a surface of the plunger toward the opened end and further configured to press the locking button part or the release button part, and wherein the contact part has a size corresponding to sizes of the locking button part and the release button part.

10. The isolation valve of claim 9, comprising:
a pair of sidewall holes disposed on the core to face each other;
a pair of guide pin springs disposed on each sidewall hole; and
a pair of guide pins configured to:
guide a movement of the plunger,
be respectively provided in each sidewall hole to compress the pair of guide pin spring, and
protrude toward an inner side of the core to move on the plunger.

11. The isolation valve of claim 10, wherein the plunger includes a guide groove recessed from the surface of the plunger, wherein the guide pin moves along the guide groove.

12. The isolation valve of claim 11, wherein the guide groove comprises:
a first vertical path formed in a direction parallel to an axial direction of the plunger;
a second vertical path disposed to face the first vertical path;
a first inclined path extending a path between a highest point of the first vertical path and a lowest point of the second vertical path; and
a second inclined path extending a path between the highest point of the second vertical path and the lowest point of the first vertical path.

13. The isolation valve of claim 12, wherein the guide pin is configured to move to the first vertical path or the second vertical path when the plunger moves from the closed end to the opened end, and wherein the guide pin is further configured to move to the first inclined path or the second inclined path when the plunger moves from the opened end to the closed end.

14. The isolation valve of claim 13, wherein the valve assembly comprises: a driving plate configured to be coupled to the latch to be movable with the latch and separably contacting the valve.

15. The isolation valve of claim 14, wherein the driving plate comprises: a sealing surface separably contacting an orifice formed on the valve, and wherein the orifice is configured to fluidly communicate the first passage with the second passage through the valve.

16. The isolation valve of claim 14, further comprising: a diaphragm mounted between the driving plate and the core and configured to inhibit foreign matters from flowing into the core.

17. The isolation valve of claim 16, comprising:
a vent hole fluidly communicating the core with the first passage and penetrating the driving plate; and
a mesh filter disposed in the vent hole.

18. The isolation valve of claim 15, further comprising: a driving spring disposed between the driving plate and the valve and configured to provide a moving force to the driving plate.

19. The isolation valve of claim 15, wherein the valve comprises: a first position where the valve contacts a valve seating part provided between the first passage and the second passage to block a fluid flow between the first passage and the second passage and a second position where the valve is spaced apart from the valve seating part to allow the fluid flow between the first passage and the second passage.

20. The isolation valve of claim 19, further comprising: a valve spring configured to provide a force for separating the valve from the valve seating part between the valve seating part and an inner wall of the housing.

\* \* \* \* \*